United States Patent [19]
Quigley et al.

[11] Patent Number: 5,549,947
[45] Date of Patent: Aug. 27, 1996

[54] COMPOSITE SHAFT STRUCTURE AND MANUFACTURE

[75] Inventors: Peter A. Quigley, Pocasset; Steven C. Nolet, Leominster, both of Mass.; James L. Gallagher, Tiverton, R.I.

[73] Assignee: Composite Development Corporation, West Wareham, Mass.

[21] Appl. No.: 191,856

[22] Filed: Feb. 3, 1994

Related U.S. Application Data

[63] Continuation-in-part of Ser. No. 178,664, Jan. 7, 1994.
[51] Int. Cl.$^6$ .......................... B65H 81/00; B29D 22/00; B32B 1/08; B32B 5/12
[52] U.S. Cl. .................. 428/36.2; 156/149; 156/169; 156/173; 428/36.1; 428/36.3; 428/36.91; 428/113; 428/232; 428/252; 428/294; 428/302; 428/902
[58] Field of Search ..................... 428/36.2, 36.3, 428/113, 284, 294, 302, 408, 902, 36.1, 36.91, 232, 252; 156/173, 149, 169

[56] References Cited

U.S. PATENT DOCUMENTS

Re. 29,112  1/1977  Carter .
Re. 30,489  1/1981  Abbott .

(List continued on next page.)

FOREIGN PATENT DOCUMENTS

| 2105797 | 11/1993 | Canada . |
|---|---|---|
| 0470896A2 | 2/1992 | European Pat. Off. . |
| 2219289 | 9/1974 | France . |
| 2501579 | 9/1982 | France . |
| 2516859 | 5/1983 | France . |
| 1704925 | 7/1971 | Germany . |

OTHER PUBLICATIONS

"Tygon Tubing", Bulletin T-104, Norton Performance Plastics, Akron, Ohio.
R. Monks, "Two Trends in Composites", Plastics Technology, pp. 40–45, Mar. 1992.
"Advanced Production Systems for Composite", The Shape of Things to Come, Goldsworthy Engineering, Inc.

(List continued on next page.)

*Primary Examiner*—James D. Withers
*Attorney, Agent, or Firm*—Lahive & Cockfield

[57] ABSTRACT

The invention provides improvements to a composite member that has a plurality of plies. The improved composite member has (1) an interior ply which functions to dampen or resist sudden forces exerted on the composite member, (2) an intermediate load-carrying ply, and (3) an exterior abrasion-resistant ply. These plies have multiple, often intertwined fiber components disposed or imbedded with a matrix material, preferably Nylon-6 thermoplastic, to inhibit sharp edges during breakage. One or more of the plies typically has "bi-axial" or "tri-axially" braided fiber geometries wherein one or more fibers are helically wound about the circumference of the member. The helically oriented fibers are oriented at a selectively variable angle which influences the overall bending strength of the composite material. In one aspect, the angles of the fiber components and other factors are used to maintain substantially uniform cross-sectional area over the length of the tubular member while simultaneously varying the bending stiffness. In another aspect, the intermediate ply is constructed with two or more sub-plies. Such sub-plies can include tri-axially extending plies, and circumferentially-wound plies. The circumferentially-wound plies are often wound more tightly at the ends of the composite member to increase resistance to stresses caused by objects within the tubular shaft. A composite member constructed according to the invention resists sudden or impact forces and has high, selectively variable bending strength, high impact resistance, and safe failure modes.

25 Claims, 12 Drawing Sheets

U.S. PATENT DOCUMENTS

| | | |
|---|---|---|
| 2,602,766 | 7/1952 | Francis . |
| 3,007,497 | 11/1961 | Shobert . |
| 3,080,893 | 3/1963 | Craycraft ............................. 138/141 |
| 3,256,125 | 6/1966 | Tyler . |
| 3,489,636 | 1/1970 | Wilson . |
| 3,561,493 | 2/1971 | Maillard et al. . |
| 3,762,986 | 10/1973 | Bhuta et al. . |
| 4,023,801 | 5/1977 | VanAuken . |
| 4,171,626 | 10/1979 | Yates et al. . |
| 4,248,062 | 2/1981 | McLain et al. . |
| 4,268,561 | 5/1981 | Thompson et al. . |
| 4,612,241 | 9/1986 | Howard, Jr. . |
| 4,625,671 | 12/1986 | Nishimura . |
| 4,657,795 | 4/1987 | Foret . |
| 4,668,318 | 5/1987 | Piccoli et al. . |
| 4,699,178 | 10/1987 | Washkewicz et al. . |
| 4,716,072 | 12/1987 | Kim . |
| 4,759,147 | 7/1988 | Pirazzini . |
| 4,791,965 | 12/1988 | Wynn . |
| 4,840,846 | 6/1989 | Ejima et al. . |
| 5,048,441 | 9/1991 | Quigley . |
| 5,188,872 | 2/1993 | Quigley . |

OTHER PUBLICATIONS

"A New Generation of High–Strength Engineered, Composite Structural Shapes", The technology exists today at Alcoa/Goldsworthy Engineering, Alcoa Goldsworthy Engineering.

"TPI Tips", News and Tips for Pultruded Thermoplastic Composites, Thermoplastic Pultrusions, Inc. V.1–No. 2, Nov. 1991 (1 page).

"TPI Tips", News and Tips for Pultruded Thermoplastic Composites, Thermoplastic Pultrusions, Inc. V.2–No. 3, May 1992 (1 page).

"TPI Tips", News and Tips for Pultruded Thermoplastic Composites, Thermoplastic Pultrusions, Inc. V.2–No. 4, Jul. 1992 (1 page).

"TPI Tips", News and Tips for Pultruded Thermoplastic Composites, Thermoplastic Pultrusions, Inc. V.2–No. 5, Sep. 1992 (1 page).

Thermoplastic Pultrusions, Inc. publication, not dated, citing New Developments (8 pages).

European Search Report dated Jan. 28, 1993, application No. EP 90 91 1104.

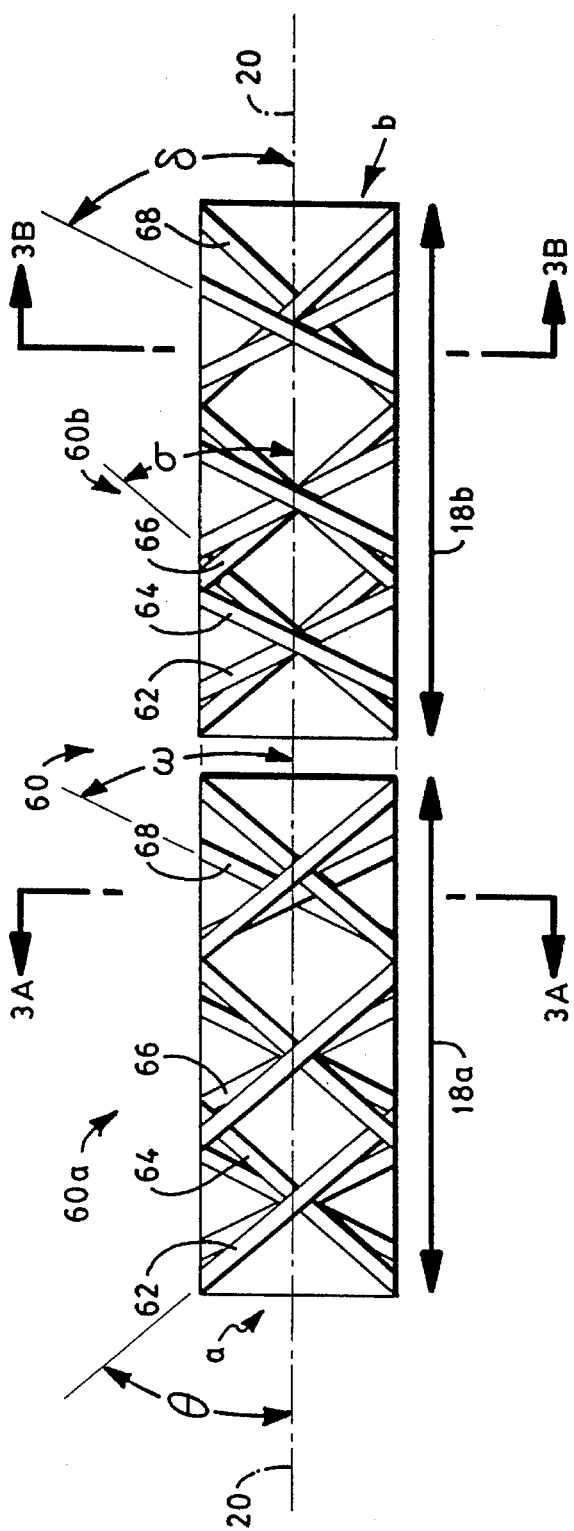
FIG. 3
FIG. 3A
FIG. 3B

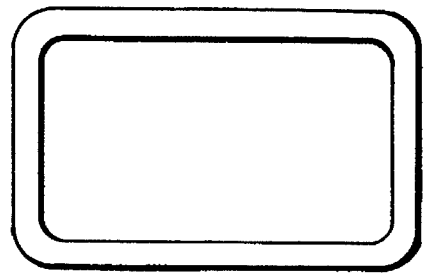
FIG. 9
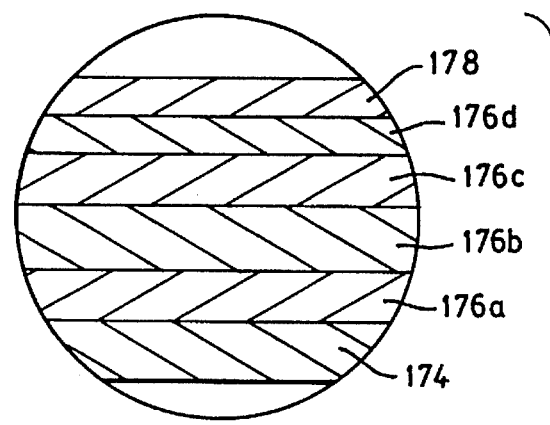
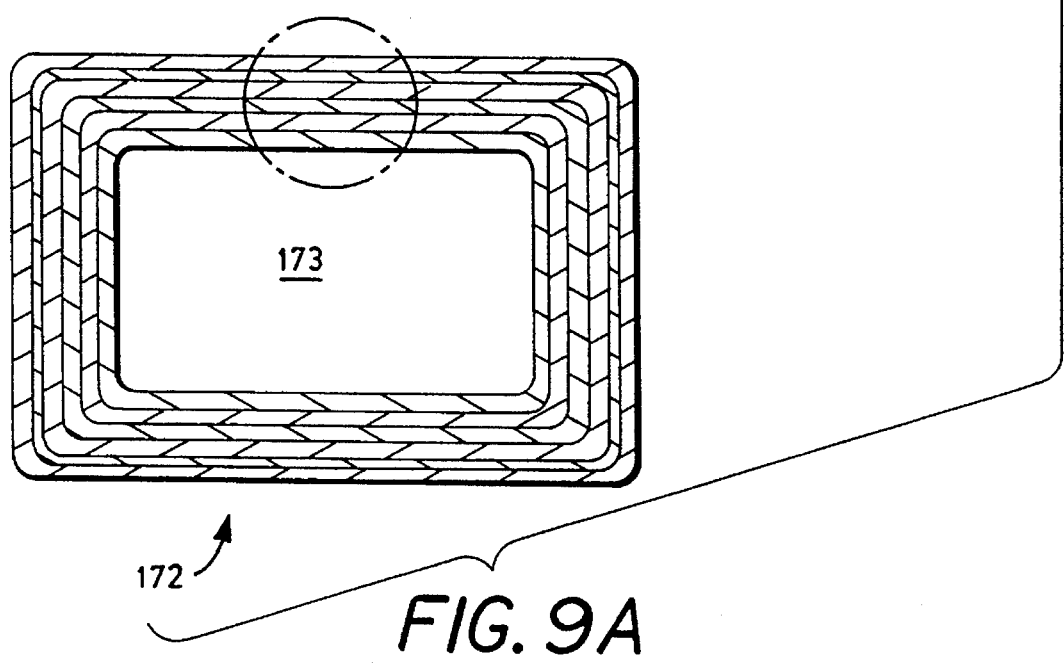
FIG. 9A

COMPOSITE SHAFT STRUCTURE AND MANUFACTURE

RELATED APPLICATIONS

This application is a continuation-in-part of the commonly-owned United States patent application Ser. No. 08/178,664, filed on Jan. 7, 1994 pending.

FIELD OF THE INVENTION

This invention relates generally to a composite member having a plurality of plies. More particularly, the invention is directed to a tubular shaft having a ply structure which provides high impact resistance, and high and selectively variable axial bending strength.

BACKGROUND OF THE INVENTION

Many sporting activities employ an implement which has a tubular shaft structure, such as a hockey stick, lacrosse stick, golf club, and ski pole.

These and like tubular sport shafts were originally made from wood. More recently, the manufacture of tubular sport shafts has improved through the use of aluminum, graphite, and a variety of composite materials, including fiberglass and carbon fiber-reinforced plastics. However, these shaft designs and constructions have performance limitations and are subject to failure or breakage, even during ordinary play.

For example, a tubular sport shaft is typically performance-limited to a constant stiffness along the axial length of the shaft. To overcome this limitation, and to accommodate certain sporting applications or user preferences, manufacturers have provided shaft designs with variable axial stiffness by tapering the shaft or by applying more or less material to a given axial location. However, these techniques often form shafts that are unwieldy for the user and are difficult to manufacture.

Furthermore, the tubular shafts of the prior art can present significant danger to the user because of insufficient impact resistance and strength. Sporting records are constantly broken; and as the limits of physical achievement increase, the demands for integrity and longevity in the strength and resistance of the shaft also increases. Presently, tubular shafts fail during the ordinary course of play because they cannot withstand the variety of forces exerted on them. Once a tubular shaft fails, it is likely to project sharp or splintered edges that can cut or seriously injure the athletes.

Thus, further improvements are desired in the performance and construction of tubular, i.e. hollow, shafts. Accordingly, one object of the present invention is to provide a shaft suitable for sporting implements and which has improved impact resistance and bending strength, as compared to the prior shafts.

Another object of the invention is to provide an improved tubular shaft having selectively and controllable variable axial stiffness with constant cross-sectional area. A corollary object of the invention is to provide improvements to the manufacture of a tubular shaft having a selectively variable axial stiffness.

Still another object of the invention is to provide a shaft, suitable for example for a sporting implement, and which produces relatively few sharp edges and injurious splinters upon breakage.

Another object of the invention is to provide improvements in the structure and manufacture of composite members and materials which, for example, are suitable for use in the manufacture and construction of the above-described tubular sport shafts.

Composite materials and members are generally known, particularly in applications which require light weight and high strength. Such composite members typically have one or more plies, or layers, in combination with a polymer matrix. The geometry of the fiber components within the each ply or layer contributes to the strength and other physical properties of the composite member. U.S. Pat. No. 5,188,872 discloses one composite member having high bending strength. However, the structure and manufacture of this composite member has limitations when applied to the wide variety of tubular shafts used in sports such as hockey, golf, lacrosse and skiing.

Accordingly, the objects of the invention include providing composite members having improvements in impact resistance and bending strength.

Another object of the invention is to provide a composite member having selectively variable axial stiffness with constant cross-sectional area.

Yet another object of the invention is to provide improvements in the manufacture of composite members having variable axial stiffness.

These and other objects of the invention will become apparent in the description which follows.

SUMMARY OF THE INVENTION

As used herein, "shaft-like composite member" denotes a hollow, tubular member and includes sport implements such as a "shaft", "stick", "club" and "mallet". Likewise, "fiber component" includes the terms "fiber", "preform" and "yarn", and is used to describe any fiber-like material which can be interwoven, matted, stitched, wound and/or spooled in a selected or a random orientation. Additionally, "ply" includes the terms "laminae", "layer" and "sub-ply", and sometimes denotes a layered composition with layers, sub-plies or a plurality of fiber components.

In one aspect, the invention provides improvements to an axially extending shaft-like composite member that has a plurality of plies and a primary stiffness along a longitudinal axis. The improvement includes at least one impact-resistant interior ply that resists or dampens sudden forces exerted on the composite member. The interior ply has a first fiber component with a matrix material and provides a minor first fraction of the bending stiffness of the composite member.

Another feature of the improvement is at least one load-carrying intermediate ply which is exterior to the interior ply and which substantially carries the loads exerted on the composite member. The intermediate ply has a second fiber component with the matrix material and provides a major second fraction of the composite member's bending stiffness. A further feature of the improvement is the provision of at least one exterior ply which is exterior to the intermediate ply and which resists abrasion. The exterior ply has a third fiber component with the matrix material and provides a third fraction of the composite member's bending stiffness. Each ply contributes to the total bending strength of the composite member.

The first, second and third fractions sum to the entire bending stiffness of the composite member; and, the second fraction is greater than either of the first and third fractions. Often, the second fraction has a magnitude that is at least two times greater than either of the first and third fractions. Preferably, the third fraction is less than the first fraction. In one illustrative practice of the invention, the first, second, and third fractions provide, respectively, ≧20%, ≦50%, and ≧30% of the total bending stiffness of the composite member.

Further in accord with the invention, the matrix material of the shaft-like composite member is selected from a group of resin-based materials, such as thermoplastic, polyether-ether-ketone, polyphenylene sulfide, polyethylene, polypropylene, urethanes, epoxy, vinylester, and polyester; and a preferred matrix material is Nylon-6.

Other aspects of a shaft-like composite member according to the invention include additional fiber components which are interwoven, mixed with, or otherwise combined with the fiber components of at least one of the three plies. In one practice of this feature, a stitching fiber is interwoven with a selected fiber component and with itself. The stitching fiber binds the ply together by linking the fiber components of a ply together with a common thread, e.g., to form a web-like ply. It may be made from glass, carbon, aramid, polyester and mixtures thereof. In a preferred practice, the stitching fiber is helically wound and is interwoven with at least one fiber component of at least one ply, i.e. of the interior ply, or the intermediate ply, or the exterior ply.

More particularly, a three-ply composite member according to the invention preferably includes additional fibers, similar to the above-mentioned stitching fiber, which bind at least one ply together and which provide selected features and characteristics. For example, in one preferred practice, a clockwise helically oriented fiber component and a counter-clockwise helically oriented fiber component are each interwoven with the fiber component of at least one ply. Each helically oriented fiber component has a selectively variable angle relative to the longitudinal axis of the composite member and the two angles preferably are of equal magnitudes at any location along the longitudinal axis of the member. Further, that angle can change along the member's axial length to adjust the member's bending stiffness, if desired. The two fiber components are thus complimentary in geometry, and extend with a pitch angle that is selectively varied along an axis of the member, to attain a selected stiffness character. These helically oriented fiber components are typically made from carbon, glass, polyester, aramid, and mixtures thereof.

In yet another aspect according to the invention, at least one ply of the three-ply composite member is bi-axially braided, and that ply includes both a clockwise helically oriented fiber component and a counter-clockwise helically oriented fiber component. The two fiber components preferably are interwoven.

Another aspect of the invention provides one or more tri-axially braided ply geometries within one of the interior, intermediate, and exterior plies. The tri-axially braided ply has (1) an axially extending fiber component that has a first helical orientation relative to the longitudinal axis, (2) a first helically oriented fiber component oriented clockwise relative to the first helical orientation, and (3) a second helically oriented fiber component oriented counter-clockwise to the first helical orientation. One or more of the helically oriented fiber components are preferably interwoven with the axially extending fiber component. In a three-ply composite member according to the invention, the intermediate ply is preferably tri-axially braided, or includes one or more tri-axially braided sub-plies.

In other aspects according to the invention, the first fiber component is selected from materials including aramid, glass, linear polyethylene, polyethylene, polyester, and mixtures thereof; the second fiber component is selected from materials including carbon, glass, aramid, and mixtures thereof; and the third fiber component is selected from materials including glass, polyester, and mixtures thereof.

The invention also provides additional plies and sub-plies for such a three-ply shaft-like composite member. In one aspect, the composite member has a fourth ply that has a fourth fiber component, typically made from polyester or glass, disposed with the matrix material as in other plies. The fourth ply is exterior to the exterior, third ply, and provides a fourth fraction of the bending stiffness. That fraction typically is less than ten percent of the total bending stiffness of the composite member. In one practice of this embodiment of the invention, the third ply has enhanced abrasion resistance, and the fourth ply provides a desired cosmetic appearance.

According to other aspects of the invention, the intermediate ply has two or more sub-plies. At least one sub-ply is preferably tri-axially braided. In one practice of the invention, another sub-ply includes a fiber component that is circumferentially wound about the member to resist stresses generated from within the shaft, e.g., by objects inserted within the shaft. The circumferentially-wound fiber component is preferably adjacent to the exterior ply and functions to bind together the other fiber components of the intermediate and interior plies and to resist longitudinal splitting of the member. Accordingly, in another aspect, the circumferentially-wound fiber component of the sub-ply is wound more tightly at the ends of the member to provide greater strength at those ends. More particularly, the fiber component of the circumferentially-wound sub-ply is helically oriented at a selected angle relative to the longitudinal axis of the member. In one aspect, the angle is variably selected so that the angle is greater at at least one end of the member than at selected other locations along the member. Thus, for example, when a hockey blade is inserted within the tube at that end of the member, the circumferentially-wound ply increases the stress-resistance at the end such that the overall integrity of the member remains even with the added internal stress caused by the hockey blade.

In still another aspect, the invention provides improvements to a composite member having at least one ply. The improvements include a first tensile fiber component, of first tensile modulus, that is clockwise helically oriented relative to the axis of the composite member such that the first tensile fiber component has a first selective angle along the length of the composite member. The improvements also include a second tensile fiber component, also of first tensile modulus, that is counter-clockwise helically oriented relative to the axis such that the angles of the first and second tensile fiber components are substantially equal and opposite along the length of the composite member.

The improvements further include third and fourth tensile fiber components in the foregoing member having at least one ply. The third tensile fiber component, of second tensile modulus, is clockwise helically oriented relative to the axis such that the third tensile fiber component has a second selective angle along the length of the composite member. The fourth tensile fiber component, also of second tensile modulus, is counter-clockwise helically oriented relative to the axis such that the angles of the third and fourth tensile fiber components are substantially equal and opposite along the length of the composite member.

In one preferred embodiment according to this practice of the invention, the first and second selective angles are variably controllable and the sum of the cross-sectional areas of the first, second, third and fourth tensile fiber components is substantially constant along the length of the composite member. The cross-sectional area of a fiber component is defined as the area of the relevant fiber component transverse to the member's axis at a given axial location along the member's length. Thus, the first and second selective angles are changed at one or more selected locations along the length of the member to attain a selected change in the bending stiffness of the composite member, but the cross-sectional area of the member nevertheless remains substantially constant. It is also preferred that a matrix material, e.g., Nylon-6, is disposed with each tensile fiber component and that the combination of the matrix material and of the fiber components have a cross-sectional area that is substantially uniform along the axis of the composite member.

In still another aspect, the invention provides a first clockwise helically oriented braiding yarn component and a second counter-clockwise oriented braiding yarn component that are interwoven with at least one of the above-described tensile fiber components.

In yet another aspect, the invention provides improved methods for manufacturing an axially extending shaft-like composite member with a plurality of plies such that the bending stiffness of the member is selectable along the axis. The manufacture includes: (1) forming a first ply with first and second fiber components, of first tensile modulus, such that the first fiber component is clockwise helically oriented relative to the axis of the composite member and the second fiber component is counter-clockwise helically oriented relative to that axis; (2) arranging the first and second fiber components at a first common selectively variably angle along the length of the composite member, i.e. at equal and opposite angles and with a selected variation in the angles along one dimension of the member; (3) forming a second ply over the first ply and with third and fourth fiber components, of second tensile modulus, such that the third fiber component is clockwise helically oriented relative to the axis of the composite member and the fourth fiber component is counter-clockwise helically oriented relative to the axis; (4) arranging the third and fourth fiber components at a second common selectively variably angle along the length of the composite member. The selected angle can controllably vary along one dimension to vary the bending stiffness of the member along that dimension.

The manufacture preferably arranges the first ply and the second ply such that the combined-sectional area of the first ply and of the second ply is substantially constant along the length of the composite member so that the member has constant tubular width along its length. The cross-sectional area of a ply is defined as the area of the relevant ply transverse to the member's axis at a given axial location along the member's length.

The method of the invention thus constructs a shaft-like composite member that has several advantages. First, it has relatively high strength and high impact resistance. Secondly, it has relatively light weight, as compared to conventional tubular shafts. Third, in the event of breakage, the member develops relatively few sharp, injurious splinters or edges. The invention attains this result by sandwiching the primary load-carrying ply between two plies in a manner that confines sharp components within the protective sleeve and hardened matrix material of the adjoining laminates or plies.

The invention is next described further in connection with preferred embodiments, and it will be apparent that various additions, subtractions, and modifications can be made by those skilled in the art without departing from the scope of the invention

BRIEF DESCRIPTION OF THE DRAWINGS

A more complete understanding of the invention may be obtained by reference to the drawings, in which:

FIG. 3 is a side view of a composite member constructed in accordance with the invention that has bi-axially braided fiber components at multiple, selectively variable angles along the length of the composite member;

FIG. 3A shows a cross-sectional view of the composite member of FIG. 3 at a first selectively variable angle;

FIG. 3B shows a cross-sectional view of the composite member of FIG. 3 at a second selectively variable angle;

FIG. 9 is a cross-sectional view of a composite member, representative of a hockey shaft, that is constructed in accordance with the invention;

FIG. 9A is a cross-sectional view of a three-ply laminate, constructed according to the invention, that has four-sub-plies forming an intermediate ply with one sub-ply being circumferentially-wound to resist longitudinal splitting;

DETAILED DESCRIPTION OF ILLUSTRATED EMBODIMENTS

A composite member according to the invention is generally an elongate shaft which has a bending stiffness along a longitudinal axis and which can have a variety of tubular cross-sectional shapes, including circular, oval, rectangular, square, polygonal, and the like. It is therefore well suited for constructing sporting implements which require a tubular shaft, e.g., a hockey stick, a lacrosse stick, a polo mallet, a golf club, and a ski pole. The composite member is constructed with a plurality of plies, each having a fiber component disposed with a matrix material, e.g., a polymer resin. The fiber and matrix materials, together with the fiber component orientations, are selected in combination to provide high impact resistance and high, selectively variable bending strength in a single tubular shaft.

Figure 1:
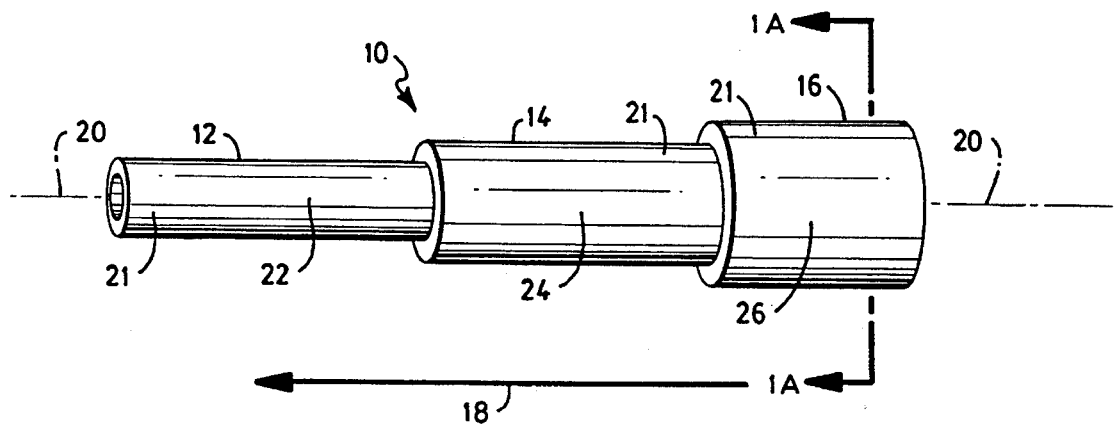
FIG. 1 is a side view, partially broken away, of a three-ply composite member constructed according to the invention.
Figure 1A:
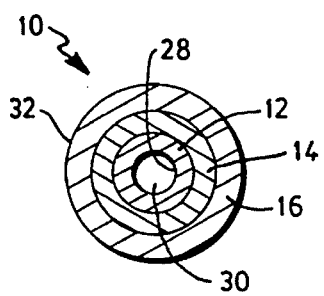
FIG. 1A is a cross-sectional view of the composite member of FIG. 1.

FIGS. 1 and 1A show a hollow, shaft-like composite member 10 in accordance with the invention which has an interior ply 12, an intermediate ply 14, and an exterior ply 16. The illustrated member normally extends straight along a longitudinal axis 20 and it resists bending from that normal profile with a selected stiffness 18. The bending stiffness 18 can selectively vary along the dimension of the member that extends along the axis 20. The bending stiffness is determined by the materials and the geometries of the plies 12, 14 and 16. The illustrated interior ply has a hollow, generally cylindrical shape. The intermediate ply likewise has a generally cylindrical shape and covers the interior ply and is contiguous with it, and the outer ply likewise contiguously covers the intermediate ply.

Each ply 12, 14 and 16 has one or more fiber components disposed or embedded with a matrix material 21, e.g., a resin. The material and the orientation for the fiber component in each ply is selected to achieve the desired strength and operational characteristics for that ply. The interior ply 12 functions primarily as an impact-resistant layer. The intermediate ply 14 functions primarily as the load-carrying element of the number 10. The ply 16 functions primarily as an abrasion-resistant layer. Accordingly, the intermediate ply 14 provides the greatest amount of bending stiffness 18 in the member 10 and thus has greater stiffness strength than either the interior ply 12 and the exterior ply 16.

In fractional terms, the plies 12, 14 and 16 are allocated, respectively, a portion, or fraction of the entire binding stiffness 18 of the composite member 10: the interior ply 12 provides a first fraction, the intermediate ply 14 provides a second fraction, and the exterior ply 16 provides a third fraction. The first, second, and third fractions sum to the entire bending stiffness. Since the intermediate ply 14 provides the greatest amount of bending stiffness 18, the second fraction is greater than either of the first and second fractions. Typically, the second fraction is at least two times greater than either of the first and third fractions. Preferably, the exterior ply 16 provides the least amount of the bending stiffness 18; thus the third fraction is preferably less than the first fraction.

More particularly, the interior ply 12 preferably provides a first fraction that is less than 20% of the total bending stiffness 18 of the composite member 10. A primary function of this ply is to reinforce the backface 28, which is the tubular wall that forms the hollowed interior 30 of the composite member 10, such that the ply 12 resists and damps an impact exerted on the outside surface of the exterior ply 16. To reinforce the backface 28, the interior ply 12 has a first fiber component 22 that is held stationary and oriented with the matrix material 21 so that the ply 12 provides less than 20% of the total bending stiffness.

Likewise, the intermediate ply 14 preferably provides a second fraction that is at least 50% of the total bending stiffness 18 of the composite member 10. A primary function of this ply is to substantially carry the bending load exerted on the composite member 10. Accordingly, the intermediate ply 14 has a second fiber component 24 that is held stationary and oriented with the matrix material 21 so that the ply 14 provides at least 50% of the total bending stiffness 18.

The exterior ply 16, which is the outer-most laminate, preferably provides a third fraction that is less than 30% of the total bending stiffness of the composite member 10. This ply has two primary functions: first, it resists abrasion; and, second, it provides an aesthetically pleasing, i.e. cosmetic, surface finish for the member 10. The exterior ply 16 has a third fiber component 26 that is held stationary and oriented with the matrix material 21 to provide less than 30% of the total bending stiffness. Preferably, the third fiber component is densely woven to form a smooth laminate on the outer surface 32.

The details concerning the orientations and geometries of the first, second and third fiber components, associated respectively with the plies 12, 14, and 16, are described below, particularly in connection with FIGS. 2A–2E.

Figure 1B:
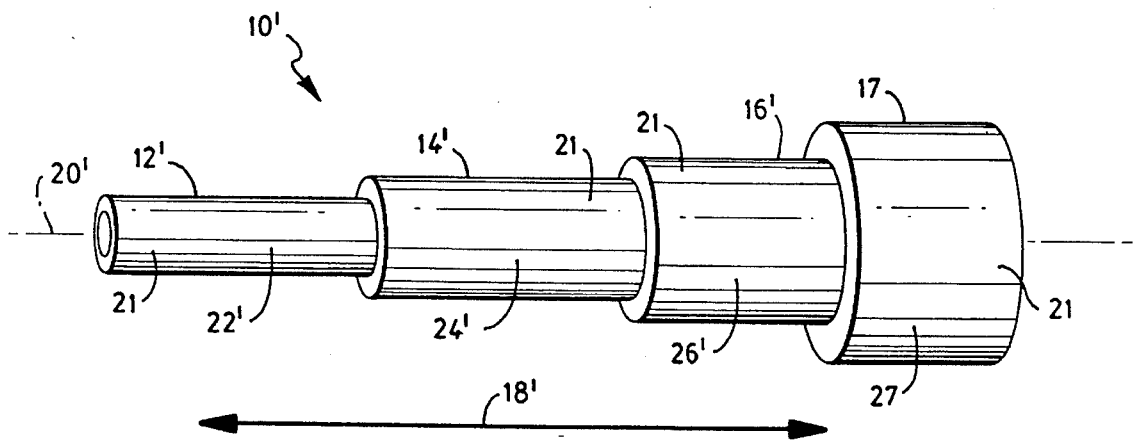
FIG. 1B is a side view, partially broken away, of a four-ply composite member constructed according to the invention.

FIG. 1B shows a variant composite member 10' that, similar to the member 10 of FIG. 1, has an inner ply 12', an intermediate ply 14', an outer ply 16', and associated fiber components 22', 24' and 26'. Also in accord with the invention, the variant member 10' has a fourth ply 17 having a fourth fiber component 27. The fourth ply has a generally cylindrical shape and contiguously covers the outer ply 16'. The fourth fiber component provides a fourth fraction of the total bending stiffness 18' of the composite member 10' which is smaller than any of the first, second, and third fractions. Preferably, the fourth ply 17 provides a stiffness fraction of less than 10% and functions primarily as an abrasion resistant veil or cosmetic exterior laminate.

It is to be understood that any ply 12, 12', 14, 14', 16, 16' and 17 can be constructed of a plurality of plies which combine to create the above-described characteristics. That is, a plurality of layers or plies can operate in combination to form any ply shown in FIGS. 1 or 1B as a compound ply.

The fiber components 22, 22', 24, 24' 26, 26' and 27 are made from a variety of materials that in combination with the matrix material, provide the requisite strength in each of the plies 12, 12' 14, 14' 16, 16' and 17. Accordingly, to form the impact resistant interior ply 12, 12', the first fiber component is preferably an aramid, e.g., Kevlar by Dupont; glass; linear polyethylene, e.g., Allied Spectra fiber; polyethylene; polyester; or mixtures thereof. To provide the specified strength and load-carrying ability of the composite member 10, 10', the second fiber component 24, 24' is preferably made from carbon, glass, or mixtures thereof. To form an abrasion resistant laminate for the exterior ply 16, 16', or the ply 17, the third and fourth fiber components 26, 26' and 27, are preferably each made from glass, polyester, or mixtures thereof.

The preferred matrix material 21 according to the invention is a high elongation, high strength, impact resistant thermoplastic material such as Nylon-6. Alternatively, a thermosetting material such as epoxy, vinyl ester, or polyester is used. The matrix material is distributed substantially uniformly among the fiber components 22, 24, and 26 of FIG. 1 and among the components 22', 24', 26' and 27 of FIG. 1B. In one application, the matrix material is generously applied in viscous form to the fiber components during manufacture such that upon hardening, e.g., through a bake or heating cycle, the matrix material hardens to stabilize the fiber components. The hardened matrix and fiber components form the solid composite member 10.

More particularly, a preferred method for distributing a Nylon-6 matrix material with the fiber components 22', 24', 26' and 27 of FIG. 1B, for example, is to impregnate the "dry" fiber components, i.e., the fiber preform comprising un-wetted, interwoven, or braided fibers, with a low viscosity nylon monomer, e.g., ε-caprolactam, blended with a suitable catalyst, e.g., sodium, and a promoter. Polymerization of the catalyzed and promoted ε-caprolactam occurs shortly after impregnation, yielding a high molecular weight Nylon-6 matrix material. The resulting composite member 10' is extremely durable because of the high elongation to failure of the matrix as well as its abrasion resistance and ability to prevent crack propagation.

Alternatively, the matrix material is supplied in a dry, fiber or powdered form which is "co-mingled" with the fiber components 22', 24', 26' and 27. By applying heat and pressure to the co-mingled fiber components and dry matrix material, the matrix melts and impregnates the fiber preform components 22', 24', 26' and 27 to yield the final composite member 10'.

While Nylon-6 is deemed a preferred matrix material for use with the invention, thermosetting resins in the epoxy, vinyl-ester or polyester groups represent alternative matrix materials suitable for the above-described high strength shaft-like composite members. For example, Polyether-Ether-Ketone (Peek), Polyphenylene Sulfide (PPS), Polyethylene, Polypropylene and Thermoplastic Urethanes (TPU's) all provide a level of damage tolerance for the composite shaft 10, 10' that is similar to, albeit apparently less than, Nylon-6.

Each of FIGS. 2A–2E illustrate a "flattened out" view of a ply 40 in accordance with the invention and is suitable for constructing a ply 12, 12', 14, 14', 16, 16' and 17 of a shaft-like composite member 10 or 10'. Each drawing thus shows a planar projection of a ply 40 that has a generally cylindrical shape. The ply 40 provides a bending stiffness 43 that is substantially along an axis 41 of that cylindrical shape. Each ply 40 has at least one fiber component 42 that is representative of one of the fiber components 22, 22', 24, 24', 26, 26' and 27 described above.

Figure 2A:
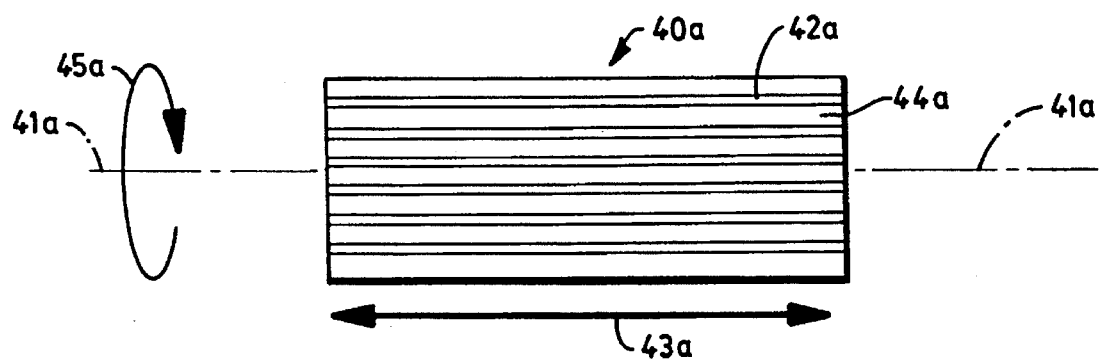
FIG. 2A is a side view of a ply, constructed according to the invention, that has unidirectional fiber components and which is suitable for constructing any of the plies in the composite member shown in FIGS. 1–1B;.

FIG. 2A shows a ply 40a that has a fiber component 42a arranged axially and unidirectionally along the longitudinal axis 41a. The matrix material 44a is disposed with the fiber component 42a in a combination that can be cured to form a solid ply, such as any of the plies 12, 12', 14, 14', 16, 16' and 17 of FIGS. 1–1B. The axial fiber geometry of FIG. 2A provides high bending strength 43a and little torsional or circumferential strength 45a. Because the fiber component does not extend circumferentially, in any amount, there is limited torsional strength 45a, so that a composite member formed with the ply 40a of FIG. 2A can be twisted relatively easily. Nevertheless, in some applications this fiber geometry is preferred. Indeed, each ply of the composite member 10 and 10', of FIGS. 1 and 1B can be formed with a unidirectional fiber component as in FIG. 2A by varying the fiber material and fiber volume to adjust the ply strength to the desired fractional strength, e.g., $\geq 20\%$, $\leq 50\%$, $\geq 30\%$, and $\geq 10\%$, respectively.

Figure 2B:
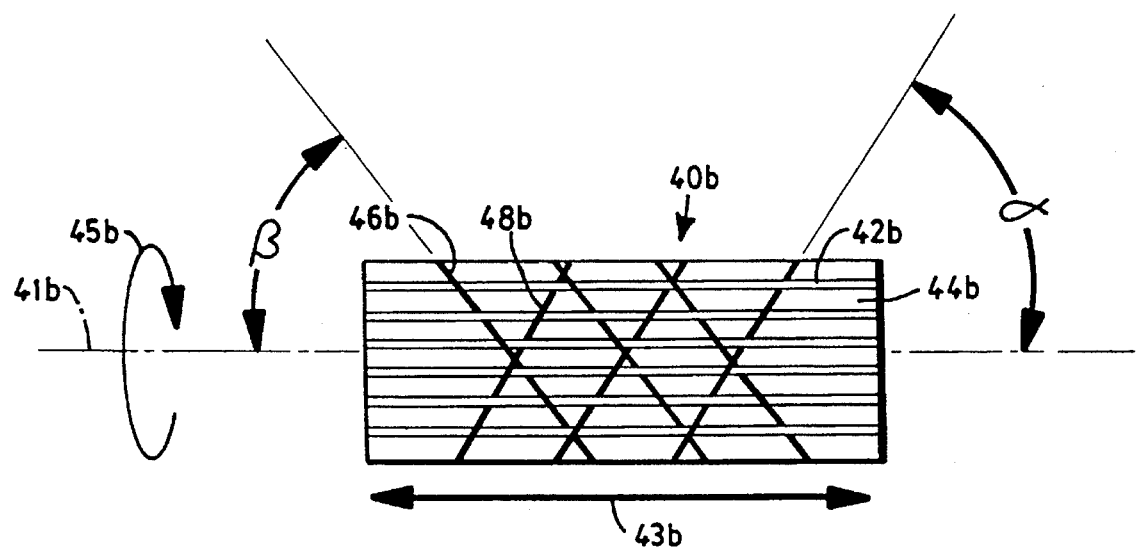
FIG. 2B is a side view of a ply, constructed according to the invention, that has tri-axially braided fiber components and which is suitable for constructing any of the plies in the composite member shown in FIGS. 1–1B;.

FIG. 2B shows a ply 40b wherein the fiber component 42b is interwoven, i.e., helically braided, with a plurality of like or different fiber components, here shown as a clockwise helically oriented fiber component 46b and a counter-clockwise helically oriented fiber component 48b. The helically oriented fiber components 46b and 48b are also preferably interwoven amongst themselves. To this end, successive crossings of two fiber components 46b and 48b have successive "over" and "under" geometries. In this configuration, the ply fiber geometry of the ply 40b of FIG. 2B, appropriately denoted as a "tri-axially" braided ply, is stronger than the axial geometry of FIG. 2A. The helically oriented fiber components 46b and 48b tend to tightly bind the longitudinal fiber component 42b with the matrix material 44b, in addition to providing increased bending stiffness 43b and torsional strength 45b. In accordance with the invention, it is preferred that at least the intermediate ply 14, 14' of FIGS. 1 and 1B has a tri-axial braided ply geometry.

Binding the fiber components together within a given ply is a preferred practice of the invention. Each helically oriented fiber can therefore be considered as a stitching fiber. In certain aspects of the invention, a single stitching fiber, such as the fiber 46b of FIG. 2B, binds the fiber component of a given ply together by interweaving the stitching fiber with itself and with the fiber component 42. A fiber is interwoven with itself, for example, by successively wrapping the fiber about the member and looping the fiber with itself at each wrap.

The fibers 46b and 48b of FIG. 2B may be of different materials, although it generally is preferred that they be the same material. The group of fiber materials suitable to form helically oriented fibers 46b and 48b includes carbon, glass, polyester, aramid, and mixtures thereof.

The angles of orientation for the fibers 46b and 48b, denoted as $\beta$ and $\alpha$ respectively, relative to the longitudinal axis 41b, are also preferably equal, although they are not required to be. Because both the bending stiffness 43b and the torsional strength 45b change when the angles $\beta$ and $\alpha$ change, it is a feature of the invention that one of more of the angles $\beta$ and $\alpha$ are adjusted to modify or change the bending stiffness 43b of the composite member to the desired magnitude. The variable angles $\beta$ and $\alpha$ are introduced during the manufacturing process.

Thus, for example, if the composite member 10' of FIG. 1B is to have increased bending stiffness 18' at a selected portion of its length along axis 20', a ply 40b from FIG. 2B that is used as any of the plies 12', 14', 16' and 17, has the variably selected angles β and α decreased towards their minimum of zero degrees in the corresponding portion of length along axis 41b. On the other hand, to increase the torsional strength and to decrease the bending stiffness of the composite member 10' at another selected portion of its length, the variably selected angles β and α are increased towards their maximum of ninety degrees in the portion of length along axis 41b corresponding to that portion of the member 10'.

Figure 2C:
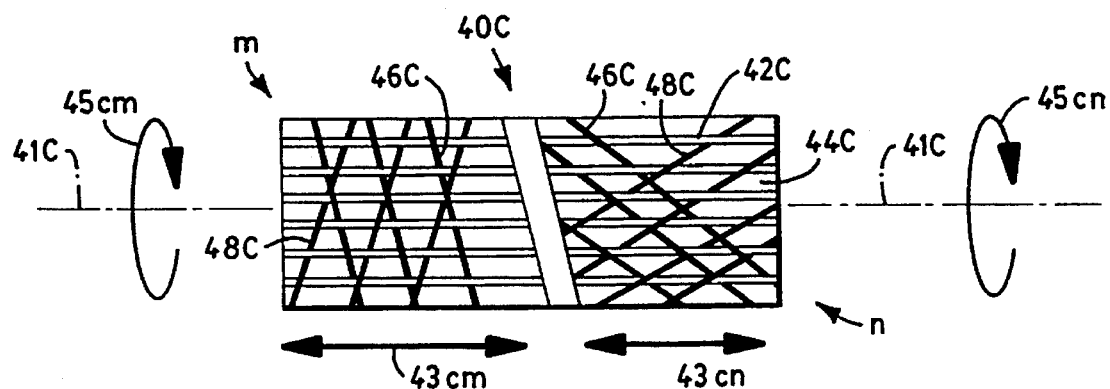
FIG. 2C is a side view of a variably stiff ply, constructed according to the invention, that has tri-axially braided fiber components at differing angles relative to a longitudinal axis and which is suitable for constructing any of the plies in the composite member shown in FIGS. 1–1B;.

A composite member in accordance with the invention has a further feature relating to selectively variable angle geometry, as shown with the ply 40c of FIG. 2C. In FIG. 2C, the helically oriented fiber components 46c and 48c of the ply have at least two separate and distinct angles relative to the axis 41c, at different axial locations within the ply 40c such that a single composite member has differing bending stiffnesses along its axial length. More particularly, and with reference to FIG. 2C, the ply 40c has two distinct sections m and n which denote regions of different fiber angles. In section m, the helically oriented fiber components 46c and 48c have a greater angle relative to the longitudinal axis 20, and thus provide greater torsional strength 45 cm and lesser bending stiffness 43 cm than provided in section n. Similarly, in section n, the helically oriented fiber components 46c and 48c have a lesser angle relative to the longitudinal axis 41c, and thus provide lesser torsional strength 45 cn and greater bending stiffness 43 cn than provided in section m.

It should be noted that the fiber components 42c, 46c and 48c preferably run continuously through the ply 40 of FIG. 2C. Therefore, the angles at which the helically oriented fibers are interwoven with the axially extending fiber component 42c are most easily changed in a real-time fashion during the manufacturing process.

A composite member constructed in accordance with the invention also includes a ply 40 that contains only helically oriented fiber components. For example, if the unidirectional fiber component 42c from FIG. 2C is removed, there remains a ply 40c having only the helically oriented fiber components 46c and 48c. Such a ply 40c is appropriately denoted "bi-axial" and, like before, can have one or more selectively variable angles to adjust the bending stiffness and torsional strength along the length of the composite member. A "bi-axial ply" can additionally include fiber components which are braided together or two sub-plys which are helically braided or filament wound.

Figure 2D:
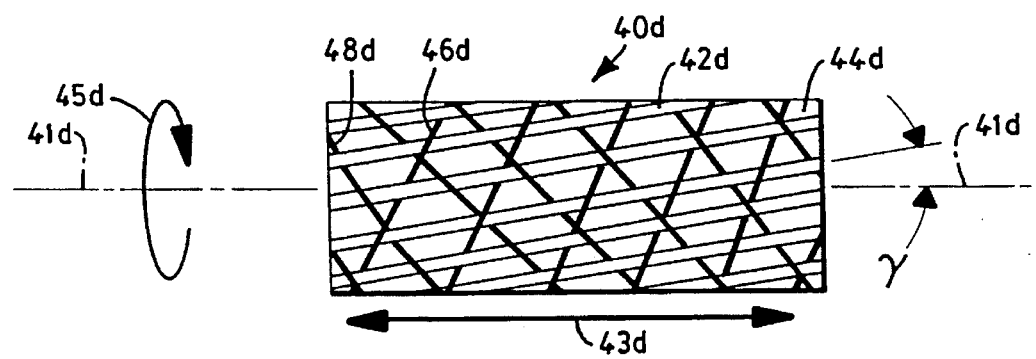
FIG. 2D is a side view of a ply, constructed according to the invention, that has tri-axially braided fiber components at an off-axis angle relative to a longitudinal axis and which is suitable for constructing any of the plies in the composite member shown in FIGS. 1–1B;.

In a preferred embodiment according to the invention, any of the plies 12, 12' 14, 14' 16, 16' and 17 of FIGS. 1–1B form a tri-axially braided structure such as illustrated in FIG. 2D. Unlike the fiber component 42 of FIGS. 2A–2C, the fiber component 42d of FIG. 2D is helically oriented relative to the longitudinal axis 41d at an angle γ, and the fibers 46d and 48d are helically oriented relative to the angle γ. The fiber component 42d preferably is selected from those fiber materials which provide significant stiffness strength with an increased tensile modulus, e.g., carbon and glass, while the fibers 46d and 48d are more appropriately selected from flexible yarn components which have a decreased tensile modulus. In accordance with the invention, it is preferred, as before, that at least the intermediate ply 14, 14' of FIGS. 1–1B have a tri-axial braided ply such as shown in FIGS. 2D or 2B.

Figure 2E:
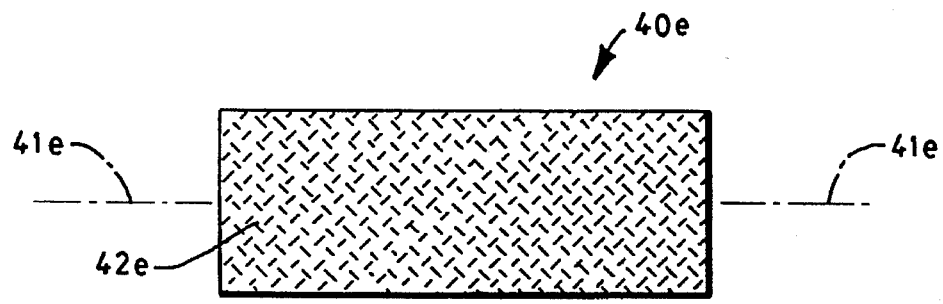
FIG. 2E is a side view of a ply, constructed according to the invention, that has matted, randomly organized fiber components and which is suitable for constructing any of the plies in the composite member shown in FIGS. 1–1B;.

FIG. 2E shows yet another geometric organization suitable for constructing any one of the plies 12, 12' 14, 14', 16, 16' and 17 of FIGS. 1, 1A and 1B. More particularly, the ply 40e of FIG. 2E has a plurality of like fiber components 42e that are randomly organized into a mat and bound with an appropriate binder matrix (not shown), such as acetate, starch, or mixtures thereof, to bind the matted fiber components 42e together. In this mat configuration, the preferred fiber component 42e materials include aramid, glass, linear polyethylene, polyethylene, polyester, or mixtures thereof.

Figure 2F:
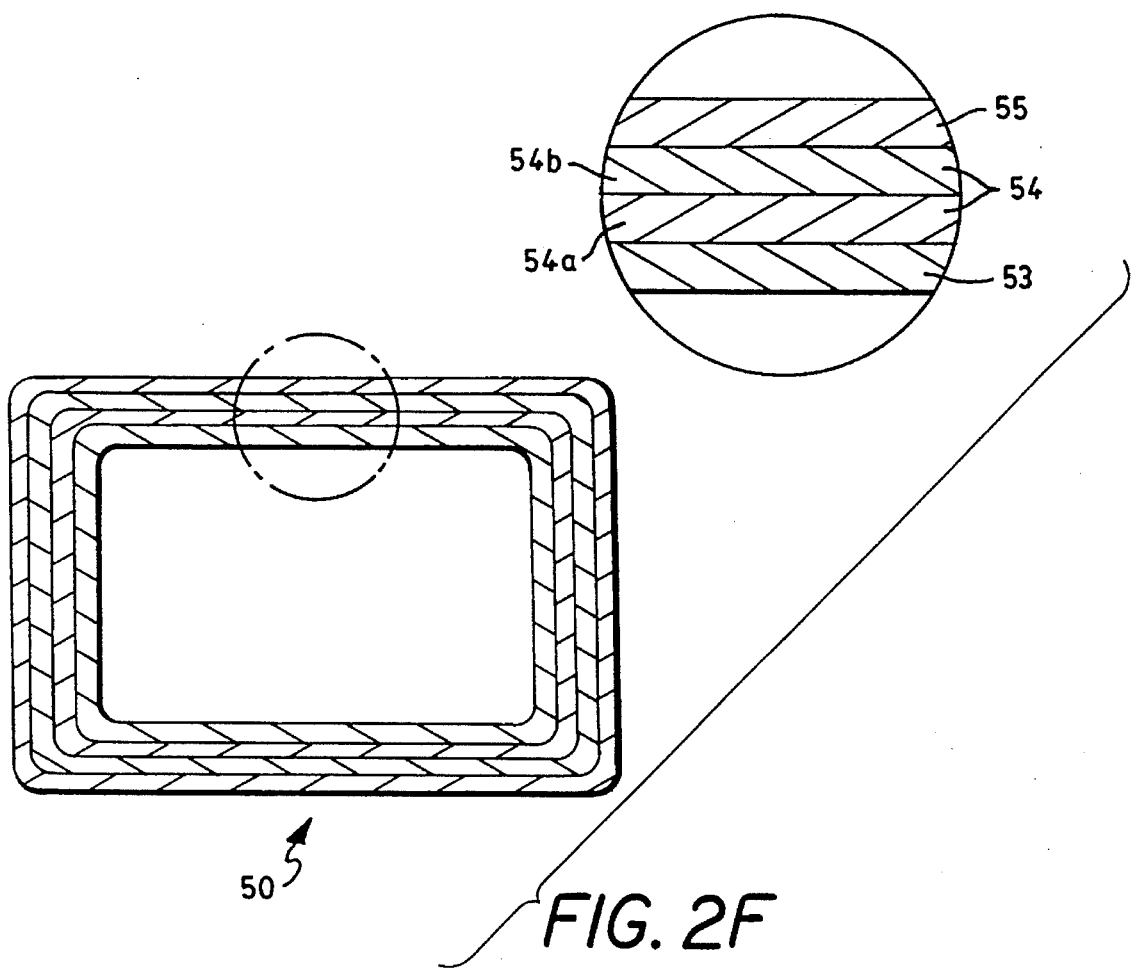
FIG. 2F is a cross-sectional view of a three-ply laminate, constructed according to the invention, that has two sub-plies forming an intermediate load-carrying ply and which is suitable for constructing the composite member shown in FIGS. 1–1A;.
Figure 2G:
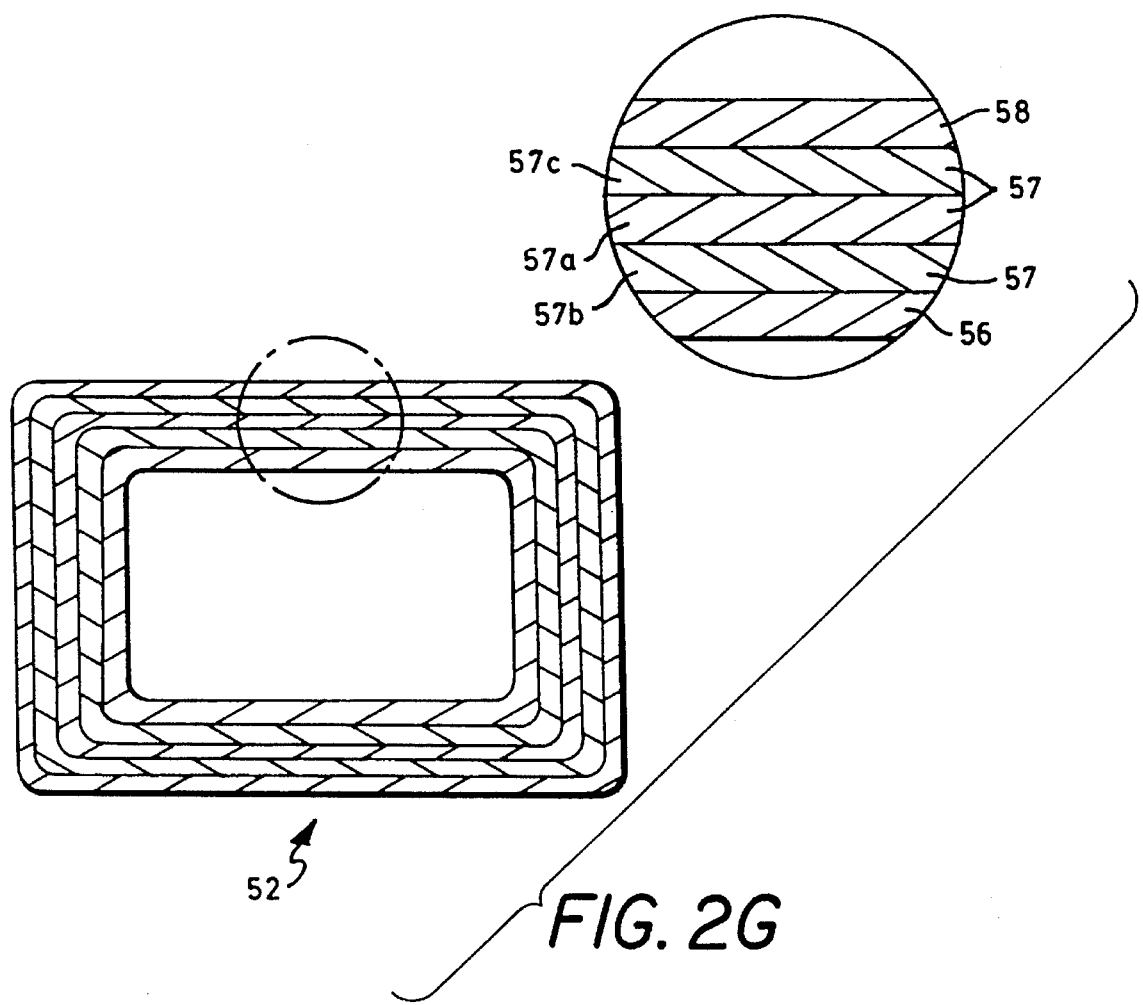
FIG. 2G is a cross-sectional view of a three-ply laminate, constructed according to the invention, that has three sub-plies forming an intermediate load-carrying ply and which is suitable for constructing the composite member shown in FIGS. 1–1A;.

FIGS. 2F and 2G show two separate cross-sectional views of two different composite structures, 50 and 52, respectively, constructed according to the invention and employing many of the ply geometries described in connection with FIGS. 1–1B and 2A–2E. Composite structure 50, for example, has an interior ply 53, a composite intermediate ply 54, and an exterior ply 55. The intermediate ply 54 is constructed with a plurality of plies, 54a and 54b, that are preferably helically braided, such as illustrated in FIGS. 2B–2D. Alternatively, the intermediate ply 54 can include at least one non-helically braided ply such as the ply 40 of FIGS. 2A and 2E. The interior ply 53 and exterior ply 55 can incorporate any of the ply structures illustrated in FIGS. 2A–2G. In any case, each of the plies 53–55 maintain their respective bending stiffness fractions of ≧20%, ≦50%, and ≧30%, respectively, as described in FIG. 1.

With reference to FIG. 2G, the composite structure 52 includes an interior ply 56, a composite intermediate ply 57, with sub-plies 57a, 57b and 57c, and an exterior ply 58. Similar to the ply structures of FIG. 2F, any of the plies 56–58 can be made from the plies described in connection with FIGS. 1–1B and 2–2E as long as the appropriate bending stiffnesses amongst the plies are maintained. In FIG. 2G, two of the sub-plies 57b and 57c preferably incorporate a helically braided ply structure such as illustrated in FIGS. 2B–2D. Additionally, the other of the intermediate sub-plies, i.e., sub-ply 57a, preferably incorporates a ply with additional axial yarn components, such as in FIG. 2A.

FIG. 3 illustrates an axially extending composite member 60 constructed in accordance with the invention that has two sections, 60a and 60b, and a longitudinal axis 20. Member 60 comprises a ply (or plies) that have first, second, third, and fourth tensile fiber components 62, 64, 66 and 68, respectively. In section 60a, the first and second tensile fiber components 62 and 64 have a first tensile modulus, representative of fiber strength, and are oriented at an equal but opposite angle θ relative to the axis 20. Likewise, the third and fourth tensile fiber components 66 and 68 have a second tensile modulus, representative of different fiber strength, and are oriented at an equal but opposite angle ω relative to the axis 20.

Accordingly, the member 60 in section 60a has a ply with multiple "bi-axial" fiber components, i.e., fiber components with equal and opposite ±angles, similar to the singular "bi-axial" ply described in connection with FIG. 2C.

In section 60b, the orientation angle of the first and second tensile fiber components 62 and 64 relative to the axis 20 has increased from θ to δ; while the orientation angle of the third and fourth tensile fiber components has decreased from ω to σ. Accordingly, the ply 60 of sections 60a and 60b exhibits differing bending stiffnesses between these sections. The particular magnitude of the bending stiffness between the sections 60a and 60b is variable and dependent upon the angles θ, δ, ω and σ, as well as the material and size of the fiber components 62, 64, 66 and 68. The first tensile modulus and the second tensile modulus are different so that the bending stiffness 18 can vary as the relative angles change amongst the tensile fiber components 62, 64, 66 and 68. These factors are determined empirically, or by calculations described in more detail below.

Preferably, the angles θ, δ, ω and σ are also selected to maintain substantially uniform cross-sectional area along the length of the member 60. Thus, when the first and second tensile fiber components 62 and 64 change from angle θ to ω, the third and fourth fiber components 66 and 68 change from angle δ to σ such that the overall cross-sectional area of the member 60 remains constant.

FIGS. 3A and 3B illustrate this feature by showing, respectively, the cross-sectional views of the member 60 at each of the sections 60a and 60b. In FIGS. 3A and 3B, the total cross-sectional areas are determined by the ply formed by the first and second tensile fiber components 62 and 64, the ply formed by the third and fourth tensile fiber components 66 and 68, the diameter of the hollowed passageway 70, and the matrix material disposed with all of the fiber components. In FIG. 3A, however, there is more cross-sectional area associated with the fibers 66 and 68 than in the related FIG. 3B. The inverse is true for the fibers 62 and 64.

The distribution of cross-sectional areas in FIGS. 3A and 3B is explained with reference to FIG. 3: in section 60a, the fibers 66 and 68 are wound more frequently about the member 60 than the fibers 62 and 64. In other words, the angle ω, associated with fibers 66 and 68, is greater than the angle θ, associated with fibers 62 and 64; and thus the winding frequency about the member 60 is greater for fibers 66 and 68 in section 60a than it is for fibers 62 and 64. The opposite is true in FIG. 3B, of course; hence the redistribution of cross-sectional areas from FIGS. 3A to 3B.

The preferred matrix material for use with the member 60 illustrated in FIGS. 3, 3A, and 3B is again a thermoplastic resin such as Nylon-6. The other resins and matrices discussed in connection with FIGS. 1–2 are also suitable.

An alternative way of interpreting the distribution of cross-sectional areas in FIGS. 3A and 3B is by analyzing the volume per-unit-length of the fibers 62, 64, 66 and 68 and the matrix material along the axis 20 of the member 60. In particular, it is preferred, according to the invention, to arrange the fibers 62, 64, 66 and 68 and the matrix material such that ratio, or volume fraction, of the volume per-unit-length of the tensile fiber components 62, 64, 66 and 68 to the volume per-unit-length of the combination of the tensile fiber components and the matrix material is substantially constant.

Similarly, the member 60 preferably has a selected matrix volume fraction. The matrix volume fraction is defined as the ratio of the volume per-unit-length of the matrix material to the volume per-unit-length of the combination of the tensile fiber components 62, 64, 66 and 68 and the matrix material. In accordance with the invention, the selectively variable matrix volume fraction is selected to alter the modulus, or bending stiffness, of the composite member 60 selectively.

The member 60 of FIGS. 3, 3A and 3B preferably has at least one helically oriented yarn component interwoven with at least one of the tensile fiber components 62, 64, 66 and 68. A yarn 46, such as shown in FIG. 2B, exemplifies one suitable helically oriented yarn component. The yarn component is made, for example, from aramid, carbon, glass, polyester, or mixtures thereof, and is used to bind the associated tensile fiber component together within the matrix. Additionally, the yarn component can add variable and selective bending stiffness to the given ply of the member 60, similar to the bi-axial or tri-axial braided plies of FIGS. 1 and 2.

In one instance according to the invention, the manufacture steps used to construct a composite member that has a plurality of plies and a selected bending stiffness along a representative axis, e.g., the axis 20 of FIGS. 1–3, are:

Step 1. Form a first ply with first and second fiber components of equal first tensile modulus such that (i) the first fiber component is clockwise helically oriented relative to the axis at a first selectively variable angle along the length of the composite member; and (ii) the second fiber component is counter-clockwise helically oriented to the axis at the same first selectively variable angle, with reversed sign, along the length of the composite member; and Step 2. Form a second ply with third and fourth fiber components of equal second tensile modulus, but with tensile strength different from the first and second fiber components, such that (i) the third fiber component is clockwise helically oriented relative to the axis at a second selectively variable angle along the length of the composite member; and (ii) the fourth fiber component is counter-clockwise helically oriented to the axis at the same second selectively variable angle along, with reversed sign, the length of the composite member.

The following additional step is implemented to change or alter the bending stiffness of the composite member at a selected location along the length of the composite member:

Step 3. Modify at least one of the first and second selectively variable angles at the selected location.

Alternatively, the following substitute step is used to change or alter the bending stiffness of the composite member at a selected location along the length of the composite member while maintaining substantially uniform cross-sectional area:

Step 3. Modify the first and second selectively variable angles at the selected location while modifying at least one of the following properties of the composite member at the selected location along the length of the composite member, (i) the matrix volume fraction, which is defined as the ratio of the volume per-unit-length of the matrix material to the volume per-unit-length of the fiber components and the matrix material, (ii) the first tensile modulus, (iii) the second tensile modulus, and (iv) the fiber volume fraction, which is defined as the ratio of the volume per-unit-length of the fiber components to the volume per-unit-length of the fiber components and the matrix material.

The calculations associated with modifying any of the above-listed composite member's properties to select an appropriate bending stiffness can be determined and described mathematically. More particularly, the composite member has the following mathematically associated properties:

(i) a first tensile modulus, $E_{f1}$; (ii) a second tensile modulus, $E_{f2}$; (iii) a first volume fraction, $V_{f1}$, associated with the first ply, and defined as the ratio of the volume per-unit-length of the first and second fiber components to the volume per-unit-length of the first and second fiber components and the matrix material; (iv) a second volume fraction, $V_{f2}$, associated with the second ply, and defined as the ratio of the volume per-unit-length of the third and fourth fiber components to the volume per-unit-length of the third and fourth fiber components and the matrix material; (v) a first variably selected angle, $\alpha_1$; (vi) a second variably selected angle, $\alpha_2$; (vii) a matrix tensile modulus, $E_R$; and (vii) a matrix volume fraction, $V_R$.

These properties combine mathematically to approximate the axial stiffness, $E_{composite}$, of the composite member according to the following relationship:

$$E_{composite} = (E_{f1})(V_{f1})\cos^4\alpha_1 + (E_{f2})(V_{f2})\cos^4\alpha_2 + (E_R)(V_R).$$

Accordingly, by selecting the desired bending stiffness, $E_{composite}$, and by modifying any or all of the properties (i)–(vii) listed above, the bending stiffness is realized, providing the composite member is manufactured in that fashion. Of course, the bending stiffness can also be modified within a single tubular shalt by, again, altering any or all of the properties (i)–(vii), as before, during the manufacturing process. Once one or more of the properties change, the resulting tubular member has multiple bending stiffnesses. Preferably, the properties (i)–(vii) are modified to maintain a uniform cross-sectional size along the length of the composite member.

The manufacturing of other tubular shafts or composite members according to the invention are best described by way of the following non-limiting examples. Further understanding of these manufacturing techniques may be obtained by reviewing U.S. Pat. No. 5,188,872, which is incorporated herein by reference.

EXAMPLE I

Composite Lacrosse Shaft

Figure 4:
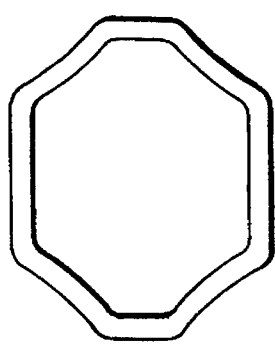
FIG. 4 is a cross-sectional view of a composite member, representative of a lacrosse stick, that is constructed in accordance with the invention.

The following details illustrate a design and method of manufacture for a linear tubular composite shaft with high bending strength, torsional rigidity, durability, and safe failure modes. The length of the composite shaft is 40 inches, and the shape and dimensions of the tubular cross-section 70 are shown in FIG. 4. The materials used to manufacture the tubular cross-sectional structure 70 of this example are detailed in Table I.

TABLE I

| Component: | Exterior Fiber Ply |
| --- | --- |
| Material: | E-Glass Fabric |
| Properties: | Fiber Modulus = $10.6 \times 10^6$ psi, Density = 2.50 g/cm$^3$ |
| Component | Intermediate Loading Carrying Plies |
| Material: | Carbon/Glass Tri-axial Tape |
| Braided: | Tape 2.9 inch width Bias yarns are (80% of total weight) oriented at 24° to the axial direction, Axial yarns are glass (20% by weight) |
| Properties: | Carbon Modulus = $34 \times 10^6$ psi, Glass Modulus = $10.5 \times 10^6$ psi, Carbon Density = 2.50 g/cm$^3$ Glass Density = 2.50 g/cm |
| Component: | Intermediate Load Carrying Ply |
| Material: | E-Glass |
| Properties: | Fiber Modulus = $10.5 \times 10^6$ psi Density = 2.5 g/cm$^3$ |
| Component: | Interior Fiber Ply |
| Material: | ADB 10 |
| Properties: | Fiber Modulus = $18.0 \times 10^6$ psi, Density = 1.43 g/cm$^3$ |
| Component: | Matrix material |
| Material: | Epoxy Resin, Bisphenol A epoxy, Curing Agent, aromatic amine, and Accelerator, substituted sulfur compound (100:32:2 parts by weight respectively) |

The lacrosse shaft 70 of this example has a three-ply ply structure similar to the member 10 of FIG. 1. It thus provides high bending strength and stiffness, with high impact resistance and durability.

Figure 5:
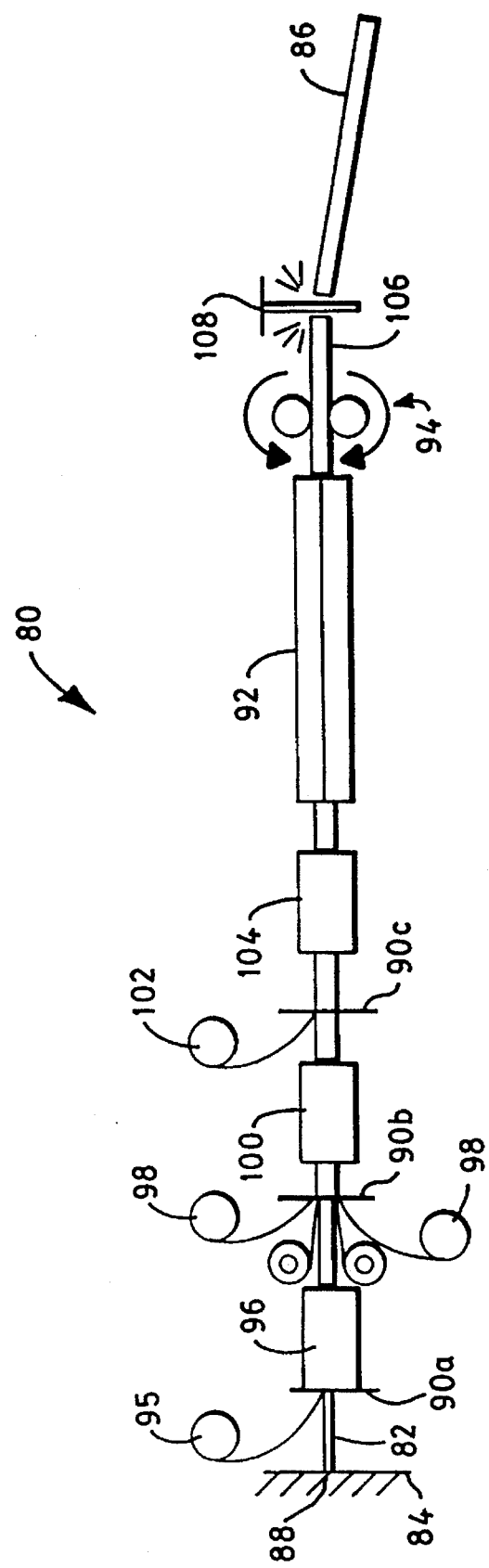
FIG. 5 is schematic side view of apparatus suitable for manufacturing a composite member such as the lacrosse stick of FIG. 4.

The apparatus 80 of FIG. 5 illustrates the multiple manufacturing components and process steps which are needed to construct the lacrosse stick 70, which is representative of many of the composite members described herein. The process begins with a stationary mandrel 82 affixed to a rigid frame 84. The mandrel 82 is fabricated from 4140 tool steel, known to those skilled in the art, and ground and chrome plated to form the internal profile of the finished shaft 86. The mandrel 82 extends from the mandrel support point 88 through the fiber forming guide 90a and through the center of the heated die 92. The end point (not shown) of the mandrel 82 coincides with the exit of the heated die 92. All fiber and matrix materials are drawn through the heated die 92 by a rotating or reciprocating pulling mechanism 94.

In operation, the pulling mechanism 94 draws the interior impact resistant fiber component 95, e.g., the first fiber component 22 of FIG. 1, through a forming guide 90a which wraps the fiber component around the stationary mandrel 82. The preferred pulling rate is 12 inches per minute. The wound interior fiber components 95 then proceeds downstream into a bath 96 of matrix material, e.g., Nylon-6 or liquid epoxy resin, where it is coated liberally with the matrix material. The exit of the bath 96 has an aluminum or steel plate (not shown) with a hole to match the cross-sectional width of the mandrel 82 plus the formed, wetted interior ply 99. This machined plate strips away excess matrix material from the surface of the interior ply to minimize dripping of excess matrix material after the mandrel 82 and formed interior ply 99 exit the bath 96.

After exiting the bath 96, the intermediate, load-carrying fiber components 98 are applied. In one embodiment, twenty strands of E-glass fiber 98 pass through a suitable forming guide 90b to wrap around the interior ply 99 and form the fiber components of the intermediate ply 101. Preferably, the intermediate ply 101 in this embodiment consists of two sub-plies that have tri-axially braided fiber components 98 over the underlying interior ply 99.

After applying the plurality of intermediate fiber components 98, which form the intermediate ply 101, the interior ply 99 wrapped with intermediate fiber components 98 enters a second bath 100 of matrix material where it is again liberally coated with epoxy. Like before, excess matrix material is stripped from the surface of the wetted intermediate ply 101 by a machined plate (not shown) at the exit of the bath 100.

The exterior abrasion resistant fiber components 102 forming the exterior ply 105 is then braided over the intermediate ply. A suitable forming guide 90c wraps the fiber components 102 around the wetted interior and intermediate plies 99 and 101 whereafter it is drawn through a third bath 104 of matrix material for the final application of epoxy. The entire wetted fiber preform, i.e., the interior and intermediate plies 99 and 101 wrapped with abrasion resistant fiber components 102, is then drawn through the bath 104 and through another machined plate (not shown) which strips excess resin from the surface of the now-formed exterior ply 105.

At this point, the preform of the three plies is pulled into a heated steel die 92. The steel die 92 is fabricated from 4140 tool steel, known to those skilled in the art, and consists of two halves forming a split cavity. It is machined and ground to form the external profile of the shaft and the molded surfaces are plated with a 0.0015" thick layer of hard chrome. The die 92 is thirty-six inches long with its center eighteen inches heated to 190° C., resulting in a temperature profile suitable to cure the wetted preform 105 as it is drawn into the die 92. The cured member 106 exits the die 92 where it is cooled and stored under ambient conditions. The cooling member 106 is drawn through the pulling mechanism 94 and through the traveling saw 108. The saw 108 separates the member 106 into uniform forty inch long segments that are used in constructing the finalized lacrosse shafts.

The resulting shaft 86 created by the apparatus 80 has the following properties:

Weight of the shaft=232.8 grams

Laminate density=1.70 g/in$^3$

Longitudinal modulus=9.52×10$^6$ psi

Bending stiffness (average EI along both axes)=2.20×10$^5$ lb-in$^2$

EXAMPLE II

Composite Hockey Shaft with Variable Bending Stiffness

Figure 6:
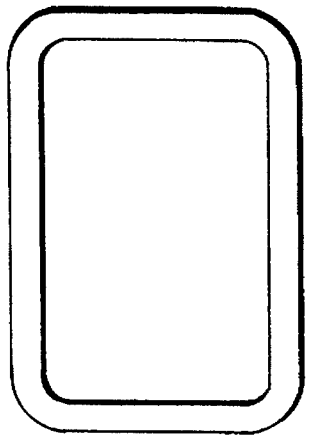
FIG. 6 is a cross-sectional view of a composite member, representative of a hockey stick, that is constructed in accordance with the invention.
Figure 7:
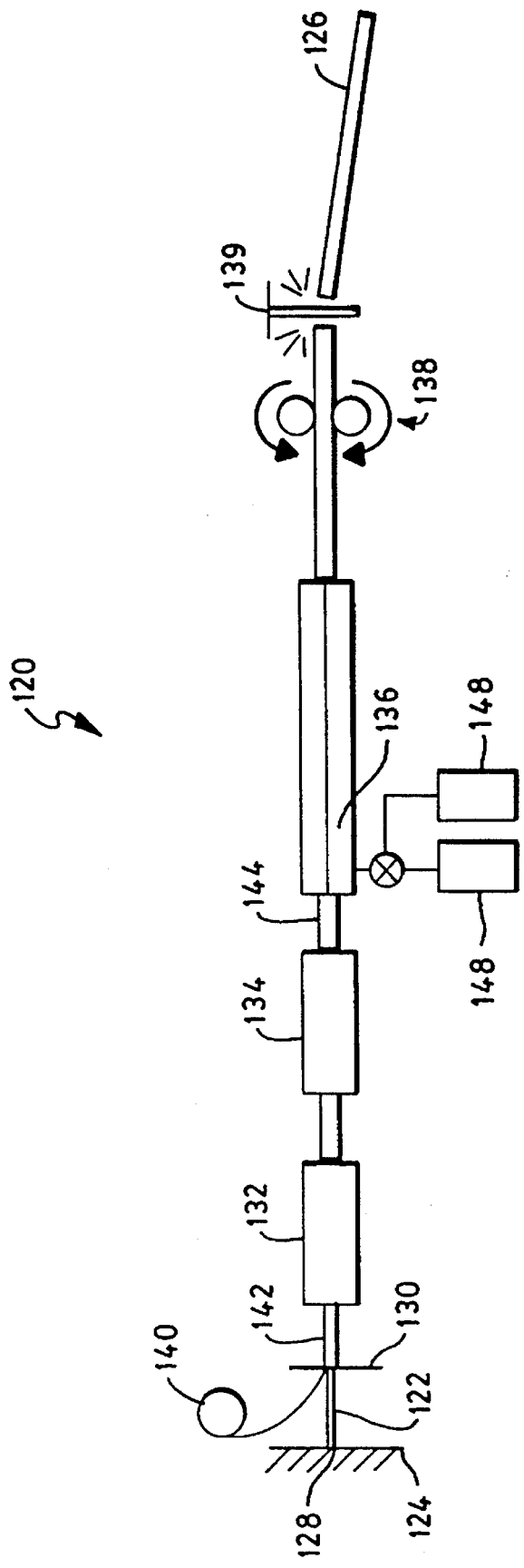
FIG. 7 is schematic side view of apparatus which includes a heated die and which is suitable for manufacturing a composite member such as the hockey stick of FIG. 6.
Figure 8:
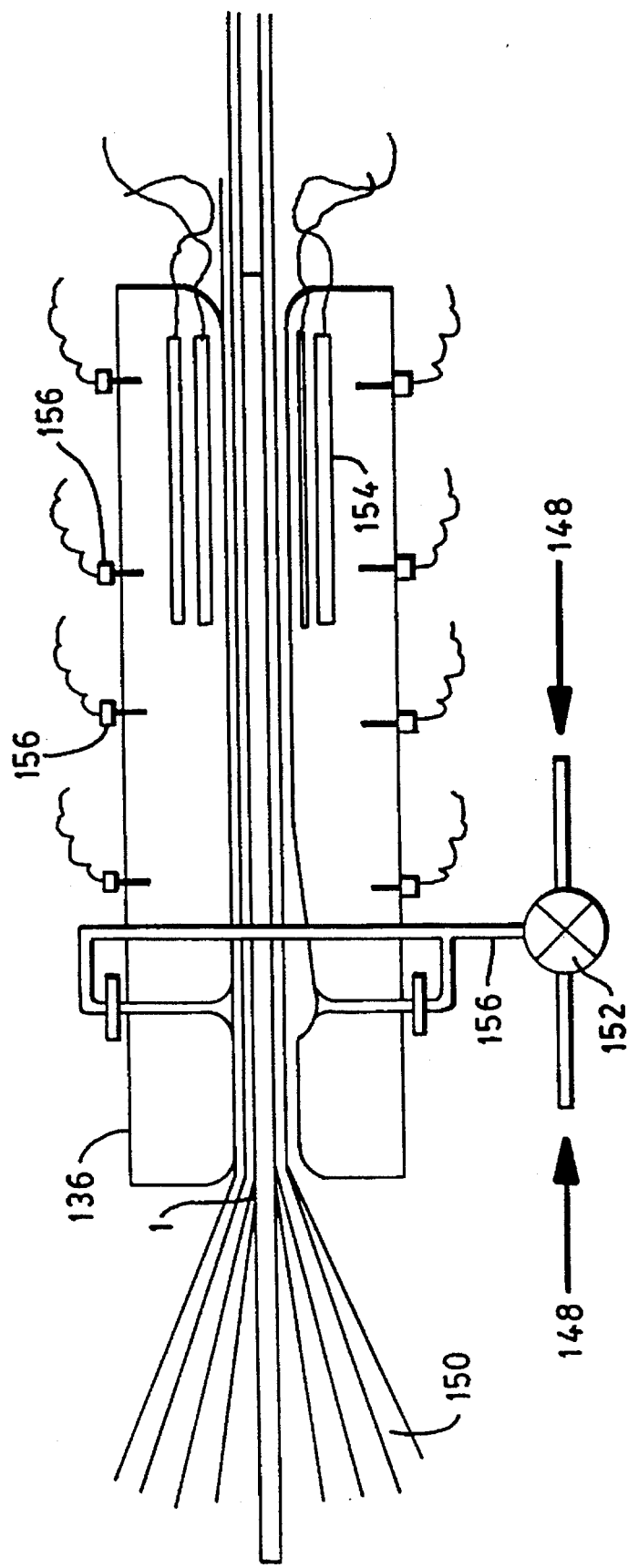
FIG. 8 is schematic side view of the heated die of FIG. 7.

The following example, and associated FIGS. 6, 7 and 8, illustrate a method of manufacture for constructing a linear tubular shaft in accordance with the invention having high bending strength, torsional rigidity, durability, and a safe failure mode. In Example II, the shaft's bending stiffness is continuously varied along the length of the shaft, which is 120 centimeters long. The dimensions of the cross-sectional tube 110 produced by the method of Example II are shown in FIG. 6, and the materials used to manufacture the structure 110 of this example are listed in Table II.

TABLE II

| Component: | Exterior Abrasion Resistant Ply |
|---|---|
| Material: | E-Glass |
| Properties: | Fiber Modulus = 10.5 × 10$^6$ psi, Density = 2.5 g/cm$^3$ |
| Component | Braiding Yarn |
| Material: | S2-Glass |
| Properties: | Fiber Modulus = 12 × 10$^6$ psi, Density = 2.48 g/cm$^3$ |
| Component: | Intermediate Loading Carrying Plies |
| Material: | Carbon Fiber |
| Properties: | Fiber Modulus = 34 × 10$^6$ psi, Density = 1.77 g/cm$^3$ |
| Component: | Interior Fiber Ply |
| Material: | ADB 10 |
| Properties: | Fiber Modulus = 18.0 × 10$^6$ psi, Density = 1.43 g/cm$^3$ |
| Component: | Matrix Material |
| Material: | Nylon-6 Thermoplastic Resin anionic polymerization of ε-caprolactam using sodium caprolactamate catalyst and activator (100%:2%;2%) |

Example II outlines the procedure for the design and manufacture of a hockey shaft with three plies, e.g., such as described in connection with FIG. 1, to achieve high bending strength and stiffness, and high impact resistance and durability. An additional feature of the Example II design is that the shaft 110 has variable stiffness along its length in accordance with the various helical braid techniques described herein. In particular, the fiber component geometry of the load-bearing intermediate ply and the exterior abrasion resistant plies is preferably a "bi-axial" or "tri-axial" braid, e.g., as illustrated in FIGS. 2B–2D.

FIG. 7 illustrates an apparatus 120 suitable for use in constructing composite shaft 110. Similar to FIG. 5, apparatus 120 has a stationary mandrel 122 affixed to a rigid frame 124. The mandrel 122 is fabricated from 4140 tool steel, known to those skilled in the art, and ground and chrome-plated to form the internal profile of the finished shaft 126. The mandrel 122 extends from the mandrel support point 128 through the fiber forming apparatus, which includes forming guides 130, helical braider 132, and helical braider 134, and through the center of the heated die 136. The end point of the mandrel 122 coincides with the exit of the heated die 136.

All materials are drawn through the heated die 136 by a rotating or reciprocating pulling mechanism 138. The pulling mechanism 138 draws the interior impact resistant fiber components 140 through a forming guide 130 which wraps the fibers 140 around the stationary mandrel 122. The pulling rate is preferably twelve inches per minute. The formed interior, unwetted ply 142 then proceeds into helical braider 132 where the interior load-carrying fiber components (not shown) are inserted and braided onto the interior, unwetted ply 142 to form the unwetted intermediate ply 143.

Similarly, the exterior abrasion-resistant fiber components (not shown) are then inserted and formed onto the intermediate ply 143 by the helical braiding apparatus 134. The completed preform 144 is thereafter pulled into the heated steel die 136 which is constructed much like the die 92 of FIG. 5. However, the die 136 additionally contains machined injection ports 148, as shown more fully in FIG. 8, to inject matrix material into the die 136.

In FIG. 8, the matrix material is pumped into the die 136 and disposed with the formed fiber components 142, 143 and 144 in liquid form from two separate reservoirs (not shown): one reservoir contains a sodium caprolactamate and caprolactam (the catalyst side); and the other reservoir contains the activator and caprolactam. The two sides are blended at the mixhead 152 in equal proportions and pumped at approximately ten pounds-per-square-inch into the injection port 156 of the steel die 136. The low viscosity of the nylon matrix monomer impregnates the fiber preform, i.e., interior, intermediate and exterior fiber components 142, 143 and 144, with the reactive monomer. The elevated temperature of the die 136, created by the heaters 154 and monitored by the thermocouples 156, accelerates the polymerization of the caprolactam as the now-wetted preform travels through the die 136. The reaction and cure are completed before the composite member exits the die 136 resulting in a finished shaft 126, FIG. 7, constructed with high impact resistant fiber architecture that is preferably impregnated by thermoplastic Nylon-6 matrix.

With further reference to FIG. 5, the fully polymerized composite member 145 exits the die 136 so that it cools in ambient conditions. The member 145 is drawn through the pulling mechanism 138 to the traveling cut-off saw 139. The cut-off saw 139 separates the composite member 145 into units that are one hundred and twenty centimeters long, which are thereafter used in constructing the commercial hockey stick.

The shaft 126 produced by the apparatus 120 of FIG. 7 and die 136 of FIGS. 7 and 8 has the following properties:

Weight of the shaft=330.3 grams

Average laminate density=1.56 g/in$^3$

Bending stiffness at base of shaft=1.427×10$^5$ lb-in$^2$

Bending stiffness at opposite end of shaft=1.096×10$^5$ lb-in$^2$

EXAMPLE III

Composite Hockey Shaft with Circumferential Windings

The following details illustrate a design and method of manufacture for a linear tubular composite shaft with high bending strength, torsional rigidity, safe failure modes, and high durability. The length of the composite shaft is 48 inches, and the shape and the dimensions of the tubular cross-section 170 are shown in FIG. 9. The materials used to manufacture the cross-sectional structure 170 of this example are detailed in Table III.

TABLE III

| Component: | Exterior Fiber Ply |
|---|---|
| Material: | E-Glass Fabric |
| Type: | 9 ox/yd$^2$ Plain Weave Fabric, 4.0 inch width |
| Properties: | Fiber Modulus = 10.6 × 10$^6$ psi, Density = 2.50 g/cm$^3$ |
| Component: | Circumferential Windings |
| Material: | Carbon Fiber placed at an angle greater than 80° to the axis of the shaft |
| Type: | Continuous, Low Modulus, High Strength graphite fiber tow Yield = 625 yd/lb |
| Properties: | Modulus = 34 × 10$^6$ psi, Density = 1.76 g/cm$^3$ |
| Component | Intermediate Loading Carrying Ply |
| Material: | Axially placed Carbon Fibers |
| Type: | Continuous, Low Modulus, High Strength graphite fiber tow Yield = 625 yd/lb |
| Properties: | Modulus = 34 × 10$^6$ psi, Density = 2.50 g/cm$^3$ |
| Component: | Intermediate Load Carrying Ply |
| Material: | E-Glass |
| Type: | 675 yield Type 30 Roving |
| Properties: | Fiber Modulus = 10.5 × 10$^6$ psi, Density = 2.5 g/cm$^3$ |
| Component: | Intermediate Load Carrying Ply |
| Material: | Continuous, Low Modulus, High Strength Carbon Fiber placed at ±45° |
| Type: | 11.7 oz/yd$^2$, Double bias stitched carbon fiber fabric fiber, 3⅝ inch wide |
| Properties: | Fiber Modulus = 34.0 × 10$^6$ psi Density = 1.76 g/cm$^3$ |
| Component: | Interior Fiber Ply |
| Material: | Randomly oriented chopped aramid fiber, non-woven fabric |
| Type: | 1.0 oz/yd$^2$, Kevlar-29 aramid fiber, 3⅝ inch wide |
| Properties: | Fiber Modulus = 18.0 × 10$^6$ psi Density = 1.43 g/cm$^3$ |
| Component: | Matrix Material |
| Material: | Epoxy Resin |
| Type: | Epoxy is Bisphenol A type, Curing Agent is aromatic amine with an Accelerator containing a substituted sulphur compound. |
| Properties: | Matrix Modulus = 0.45 × 10$^6$ psi, Density = 1.18 g/cm$^3$ |

Example III sets forth the procedure for the design and manufacture of a hockey shaft with three plies, e.g., an interior impact resistant ply, an intermediate load-carrying ply formed by multiple sub-plies, and an exterior abrasion resistant ply, to achieve high bending strength and stiffness. An additional feature of the Example III design is that the intermediate ply has an additional layer or sub-ply which provides high transverse stiffness and strength to resist longitudinal splitting.

More particularly, FIG. 9A shows a cross-sectional view of a composite structure 172 constructed according to the invention and employing many of the ply geometries described in connection with FIGS. 1–1B, 2A–2G, and 9.

Composite structure 172 has an interior ply 174, a composite intermediate ply 176, including a plurality of sub-plies 176a, 176b, 176c, and 176d, and an exterior ply 178. At least one of the sub-plies 176a and 176c preferably incorporates a tri-axially braided ply structure such as illustrated in FIGS. 2B–2D. Sub-ply 176b, on the other hand, preferably incorporates axially extending yarn components, such as in FIG. 2A. And sub-ply 176d is formed by circumferential windings. That is, sub-ply 176d has a fiber component that is helically wound about the structure 172 to provide resistance to stresses generated from within the structure 172, i.e., stresses generated from within the interior 173. The interior ply 174 and exterior ply 178 can incorporate any of the ply structures of FIGS. 2A–2E. In any case, the plies 174, 176, and 178 maintain their respective bending stiffness fractions of ≧20%, ≦50%, and ≧30%, respectively, as described in FIG. 1.

Figure 9B:
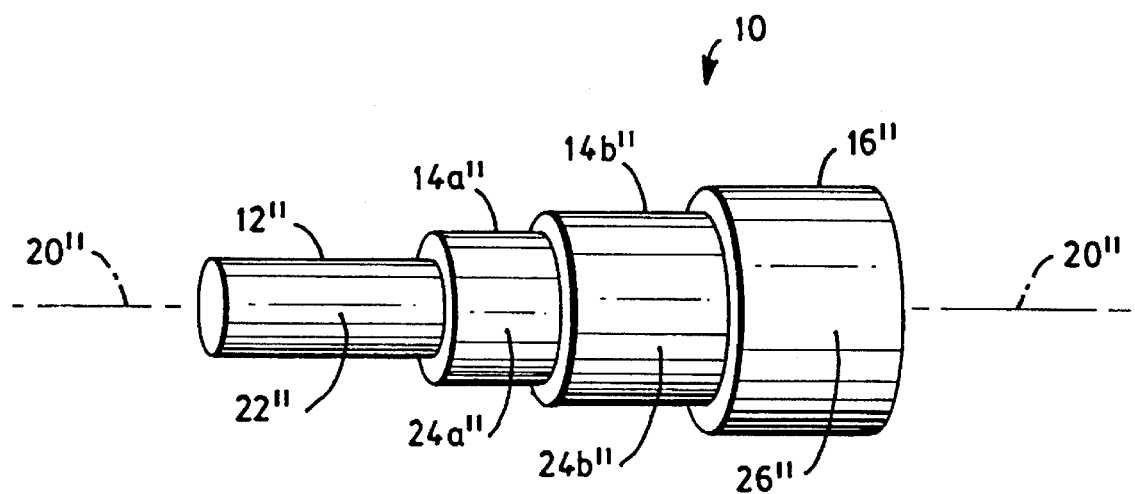
FIG. 9B shows a side view, partially broken away, of a three-ply composite member with multiple sub-plies constructed according to the invention.

Similar to the FIGS. 1, 1B showing of the invention, FIG. 9B illustrates a side view, partially broken away, of a three-ply composite member 10" constructed according to the invention. The member 10" has an interior ply 12", with a first fiber component 22", and an exterior ply 16", with a third fiber component 26", that are constructed with any of the ply geometries shown in FIGS. 2A–2E. The intermediate ply 14" is constructed with two sub-plies 14a" and 14b": sub-ply 14a" has a fiber component 24a" and is constructed with any of the ply geometries shown in FIGS. 2A–2E; and sub-ply 14b" has a fiber component 24b" that is circumferentially wound and helically oriented to the axis 20" of the member 10", for example, with the circumferentially wound component detailed in Table III. The circumferentially wound fiber component is adjacent and immediately interior to the exterior ply 16" and functions to reduce stresses generated from within the member 10", e.g., by a hockey blade telescopically mounted within the member 10".

Figure 10:
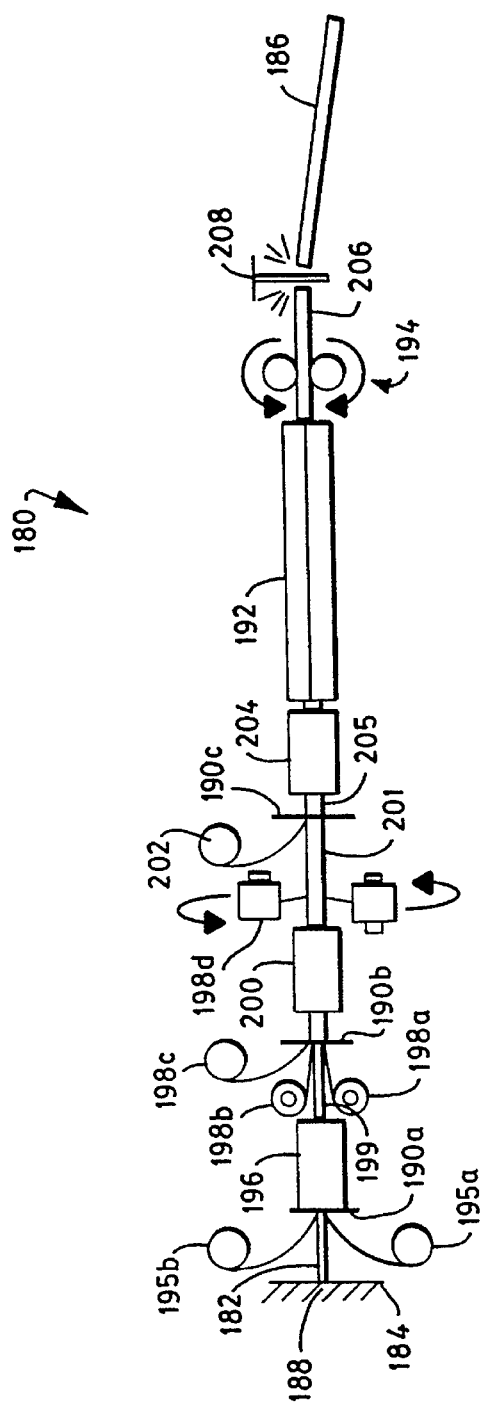
FIG. 10 is a schematic side view of apparatus which includes a heated die and which is suitable for manufacturing a composite member such as the hockey shaft of FIG. 9, the composite laminate of FIG. 9A, and the member of FIG. 9B.

The apparatus 180 of FIG. 10 illustrates the multiple manufacturing components and process steps which are suitable for constructing the hockey shaft 170 of FIG. 9, the composite structure 172 of FIG. 9A, and the member 10" of FIG. 9B. The illustrated process begins with a stationary mandrel 182 affixed to a rigid frame 184. The mandrel 182 is fabricated from 4140 tool steel, known to those skilled in the art, and ground and chrome-plated to form the internal profile of the finished shaft 186. The mandrel 182 extends from the mandrel support point 188 through the fiber forming guide 190a and through the center of the heated die 192. The end point (not shown) of the mandrel 182 coincides with the exit of the heated die 192. All fiber and matrix materials are drawn through the heated die 192 by a rotating or reciprocating pulling mechanism 194.

In operation, the pulling mechanism 194 draws the interior impact resistant fiber components 195a, 195b through a forming guide 190a which wraps the fiber component around the stationary mandrel 182. One preferred pulling rate is twelve inches per minute. The wound interior fiber components 195a, 195b then proceed downstream into a bath 196 of matrix material, e.g., Nylon-6 or liquid epoxy resin, where they are coated liberally with the matrix material. The exit from the bath 196 has an aluminum or steel plate (not shown) with a hole to match the cross-sectional width of the mandrel 182 plus the formed, wetted interior ply 199. This machined plate strips away excess matrix material from the surface of the interior ply to minimize dripping of excess matrix material after the mandrel 182 and formed interior ply 199 exit the bath 196.

After exiting the bath 196, the intermediate, load-carrying fiber components 198a, 198b, 198c, and 198d are applied.

Like in FIG. 9A, two of the sub-plies forming the intermediate ply are tri-axially braided, one sub-ply is axially extending, and one sub-ply is circumferentially wound. More particularly, the fiber components 198a and 198b are triaxially braided onto the interior ply, and the fiber component 198c is arranged unidirectionally, or axially, along the length of the mandrel and between the sub-plies formed by the components 198a and 198b. Thereafter, fiber component 198d is circumferentially wound over the other sub-plies formed by the components 198a, 198b, and 198c. In one practice of the invention, the interior fiber component 195a is formed by double bias fabric having fiber components oriented at angles of ±45° relative to the longitudinal axis. In another embodiment, 224 ends of 675 yield, E-glass fiber, and thirty-six ends of 12k (625 yield), carbon fiber pass through a suitable forming guide 190b to wrap around the interior ply 199 as part of the intermediate ply.

After forming three of the four sub-plies of the intermediate ply, the interior ply 199 wrapped with the partially-formed intermediate ply enters a second bath 200 of matrix material where it is again liberally coated with epoxy. Like before, excess matrix material is stripped from the surface of the wetted ply by a machined plate (not shown) at the exit of the bath 200.

The fourth sub-ply 198d of the intermediate ply is then wound onto the wetted ply. A pair of 12k carbon fiber tows are wound onto the laminate at a rate of approximately five revolutions per inch yielding a fiber angle of approximately 83° to the axial direction of the shaft. The fiber components of the sub-ply are circumferentially wound about the interior ply, and the other sub-plies of the intermediate ply, to tightly bind all the fiber components together. The ply 108d in one practice is a thin wrap of 0.005 inch radial thickness. The sub-ply 198d operates as a load-carrying sub-ply to resist stresses generated within the hollow interior of the shaft. For example, the sub-ply 198d is particularly useful in strengthening the composite shaft so that a hockey blade inserted and glued within the shaft does not rupture or split the composite structure during use.

The exterior abrasion resistant fiber component 202 forming the exterior ply 205 is then wrapped around the intermediate ply. A suitable forming guide 190c wraps the fiber component 202 around the wetted interior and intermediate plies 199 and 201 whereafter the assemblage on the mandrel is drawn through a third bath 204 of matrix material for the final application of epoxy. The entire wetted fiber preform, i.e., the interior and intermediate plies 199 and 201 wrapped with the abrasion resistant fiber component 202, is then drawn through the bath 204 and through another machined plate (not shown) which strips excess resin from the surface of the now-formed exterior ply 205.

At this point, the preform of the three plies is pulled into a heated steel die 192, similar to the die of FIG. 8. The steel die 192 is fabricated from 4140 tool steel, known to those skilled in the art, and consists of two halves forming a split cavity. It is machined and ground to form the external profile of the shaft and the molded surfaces are plated with a 0.0015" thick layer of hard chrome. The die 192 is thirty-six inches long with its center eighteen inches heated to 190° C., resulting in a temperature profile suitable to cure the wetted preform 205 as it is drawn into the die 192. The cured member 206 exits the die 192 where it is cooled and stored under ambient conditions. The cooling member 206 is drawn through the pulling mechanism 194 and through the traveling saw 208. The saw 208 separates the member 206 into uniform forty-eight inch long segments that are used in constructing the finalized hockey shafts.

Figure 11:
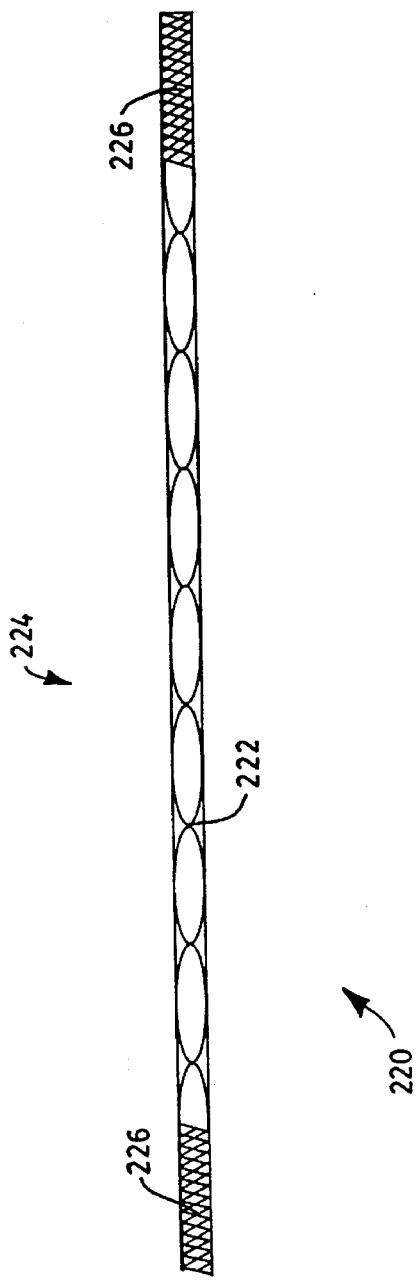
FIG. 11 illustrates a circumferentially-wound sub-ply with a shaft constructed according to the invention.

The resulting shaft 186 created by the apparatus 180 has the following properties:

Weight of the shaft=352 grams laminate density=1.64 g/cm$^3$ longitudinal modulus=5.358×10$^6$ psi longitudinal bending stiffness=1.302×10$^5$ lb-in$^2$ FIG. 11 shows illustratively a variable angular orientation of a circumferentially-wound sub-ply 220 constructed according to the invention. The sub-ply 220 is one sub-ply of the intermediate ply and is typically adjacent and interior to the exterior ply, e.g., the interior ply 16 of FIG. 1. In FIG. 11, the fiber components 222 which form the intermediate sub-ply have a reduced circumferential angle near the center 224 of the shaft and an increased circumferential angle at the ends 226 of the shaft. This variable winding angle facilitates a selective reinforcement of the shaft at the shaft ends 226 to improve the transverse strength of the shaft. Thus, by inserting a structure, e.g., a hockey blade, into the hollow interior of the shaft for mounting, the stress-reducing feature of the circumferentially-wound sub-ply 220 is enhanced at the ends of the shaft since that is where such stresses occur.

The invention thus attains the objects set forth above, in addition to those apparent from preceding description. Since certain changes may be made in the above composite member structures without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. In an axially extending composite member having a plurality of plies and having primary bending stiffness along a longitudinal axis, the improvement comprising at least one interior ply having a first fiber component with a matrix material, said interior ply providing a first fraction of the bending stiffness of said composite member and being structured to provide impact resistance, at least one intermediate ply having a second fiber component disposed with said matrix material, said intermediate ply being exterior to said interior ply and being structured to provide primary load-carrying strength and providing a second fraction of the bending stiffness such that said second fraction is greater than said first fraction, and at least one exterior ply having a third fiber component disposed with said matrix material, said exterior ply being exterior to said intermediate ply and being structured to provide abrasion resistance and providing a third fraction of the bending stiffness such that said second fraction is greater than said third fraction, and wherein said intermediate ply comprises at least one sub-ply having at least one circumferentially-wound fiber component oriented relative to said axis at a selected angle variable along the length of said member, said angle being greater at at least one end of said member for providing selective structural reinforcement at said end.

2. In an axially extending composite member according to claim 1, the further improvement wherein, at at least one axial location, said circumferentially-wound fiber component is oriented to said axis at an angle which is greater than approximately eighty degrees.

3. In an axially extending composite member according to claim 1, the further improvement wherein said circumferentially-wound fiber component is structured to resist stresses generated interior to said interior ply.

4. An axially extending composite member having at least one ply, said member comprising
- a first tensile fiber component that is clockwise helically oriented to the axis of said composite member such that said first tensile fiber component has a first angle selectively varying along the length of said composite member, said first tensile fiber component having a first tensile modulus,
- a second tensile fiber component that is counter-clockwise helically oriented to said axis at said first angle wherein said angles of said first and second tensile fiber components are substantially equal along the length of said composite member, said second tensile fiber component having said first tensile modulus,
- a third tensile fiber component that is clockwise helically oriented to said axis such that said third tensile fiber component has a second angle selectively varying along the length of said composite member, said third tensile fiber component having a second tensile modulus that is different from said first tensile modulus, and
- a fourth tensile fiber component that is counter-clockwise helically oriented to said axis at said second angle wherein said angles of said third and fourth tensile fibers are substantially equal along the length of said composite member, said fourth tensile fiber component having said second tensile modulus.

5. An axially extending composite member according to claim 4 wherein the sum of the cross-sectional areas of said first, second, third and fourth tensile fiber components is substantially constant along the length of said composite member.

6. An axially extending composite member according to claim 4, further comprising a matrix material for binding said tensile fiber components together, said matrix material being distributed with said tensile fiber components.

7. An axially extending composite member according to claim 4 wherein the combination of said matrix material and said fiber components form said at least one ply with a cross-sectional area that is substantially uniform along said axis.

8. An axially extending composite member according to claim 5, wherein said matrix material is selected from the group of resin-based materials consisting of nylon-6 thermoplastic, polyether-ether-ketone, polyphenylene sulfide, polyethylene, polypropylene, thermoplastic urethanes, epoxy, vinyl-ester, and polyester.

9. An axially extending composite member according to claim 6, wherein said tensile fiber components and said matrix material are arranged such that the ratio of the volume per-unit-length of said tensile fiber components to the volume per-unit-length of the combination of said tensile fiber components and said matrix material is substantially constant.

10. An axially extending composite member according to claim 6, wherein said tensile fiber components and said matrix material are arranged to form a substantially constant fiber volume fraction, said fiber volume fraction being defined as the ratio of the volume per-unit-length of said tensile fiber components to the volume per-unit-length of the combination of said tensile fiber components and said matrix material.

11. An axially extending composite member according to claim 4, further comprising a first clockwise helically oriented braiding yarn component and a second counter-clockwise oriented braiding yarn component, said first and second yarn components being interwoven with at least one of said tensile fiber components.

12. An axially extending composite member having at least one ply, comprising
- a first fiber component that is clockwise helically oriented to the axis of said composite member such that said first fiber component has a first angle selectively varying along the length of said composite member,
- a second fiber component that is counter-clockwise helically oriented to said axis at said first angle wherein said angles of said first and second fiber components are substantially equal along the length of said composite member,
- a third fiber component that is clockwise helically oriented to said axis such that said third fiber component has a second angle selectively varying along the length of said composite member,
- a fourth fiber component that is counter-clockwise helically oriented to said axis at said second angle wherein said angles of said third and fourth fibers are substantially equal along the length of said composite member, and
- wherein the sum of the cross-sectional areas of said first, second, third and fourth fiber components is substantially constant along the length of said composite member.

13. In a method of manufacturing an axially extending composite member having a plurality of plies and having a bending stiffness along a longitudinal axis, the improvement comprising the steps of
- forming at least one interior ply exterior to an elongate mandrel, said interior ply having a first fiber component and providing a first fraction of the bending stiffness of said composite member,
- forming at least one intermediate ply exterior to said interior ply, said intermediate ply having a circumferentially wound fiber component arranged at a selectively varying angle along the length of said member, said intermediate ply providing a section fraction of said bending stiffness such that said second fraction is greater than said first fraction, and
- forming at least one exterior ply exterior to said intermediate ply, said exterior ply having a third fiber component and providing a third fraction of said bending stiffness such that said second fraction is greater than said third fraction.

14. In a method according to claim 13, the further improvement comprising the step of arranging said circumferentially wound fiber component at an angle relative to said axis that is greater than approximately eighty degrees.

15. In a method according to claim 13, the further improvement comprising the step of orienting said circumferentially wound fiber component with a greater angle at at least one end of the member thereby increasing the resistance to stresses at said end.

16. In a method for manufacturing a composite member axially extending along an axis and having a plurality of plies, the improvement comprising the steps of
(A) forming a first ply having first and second fiber components wherein said first fiber component is clockwise helically oriented to said axis of said composite member and said second fiber component is counter-clockwise helically oriented to said axis, said step of forming a first ply including the step of arranging said first and second fiber components at a first common variable angle, $\alpha_1$, along the length of said composite member, said first and second fiber components being selected with a first tensile modulus, $E_{f1}$, (B) forming a second ply having third and fourth fiber components wherein said third fiber component is clockwise helically oriented to said axis and said fourth fiber component is counter-clockwise helically oriented to said axis, said step of forming a second ply including the step of arranging said first and second fiber components at a second common variable angle, $\alpha_2$, along the length of said composite member, said third and fourth fiber components being selected with a second tensile modulus, $E_{f2}$, that is different from said first tensile modulus, and (C) altering said first and second common variable angles at least one axial location along the length of said composite member such that the stiffness of said composite member along said axis changes at said at least one axial location.

17. In a method according to claim 16, further comprising the step of arranging said first and second plies such that the combination of the cross-sectional area of said first ply and the cross-sectional area of said second ply is substantially constant along the length of said composite member.

18. In a method according to claim 16, the further improvement wherein the step of forming said first and second plies includes disposing a matrix material having a selected matrix tensile modulus with said fiber components for binding said fiber components together.

19. In a method according to claim 18, the further improvement wherein the combination of said fiber components and said matrix are arranged such that said composite member has substantially uniform cross-sectional area along the length of said composite member.

20. In a method according to claim 16, the further improvement comprising the steps of changing the bending stiffness of said composite member at least one location along the length of said composite member and maintaining substantially uniform constant cross-sectional area along the length of said tubular member, said stiffness-changing and area-maintaining steps including modifying at least one of the following properties of said composite member at at least one location along the length of said composite member, (i) the matrix volume fraction, said matrix volume fraction being defined as the ratio of the volume per-unit-length of said matrix material to the volume per-unit-length of said fiber components and said matrix material, (ii) said first tensile modulus, (iii) said second tensile modulus, (iv) the fiber volume fraction, said fiber volume fraction being defined as the ratio of the volume per-unit-length of said fiber components to the volume per-unit-length of said fiber components and said matrix material, (v) said first common variably selected angle, and (vi) said second common variably selected angle.

21. In a method according to claim 16, the further improvement comprising the steps of (A) selecting said bending stiffness, $E_{composite}$, by selecting at least one of the following properties of said composite member,
  (i) the first tensile modulus, $E_{f1}$,
  (ii) the second tensile modulus, $E_{f2}$,
  (iii) a first volume fraction, $V_{f1}$, of said first ply, said first volume fraction being defined as the ratio of the volume per-unit-length of said first and second fiber components to the volume per-unit-length of said first and second fiber components and said matrix material,
  (iv) a second volume fraction, $V_{f2}$, of said second ply, said second volume fraction being defined as the ratio of the volume per-unit-length of said third and fourth fiber components to the volume per-unit-length of said third and fourth fiber components and said matrix material,
  (v) the first variably selected angle, $\alpha_1$,
  (vi) the second variably selected angle, $\alpha_2$,
  (vii) a matrix tensile modulus, $E_R$,
  (vii) a matrix volume fraction, $V_R$, and (B) modifying the selected property of said composite member according to the following relationship, $$E_{composite}=(E_{f1})(V_{f1})\cos^4\alpha_1+(E_{f2})(V_{f2})\cos^4\alpha_2+(E_R)(V_R),$$

wherein said selected bending stiffness, $E_{composite}$, is realized.

22. In a method for manufacturing an axially extending composite member having a first axis and a first dimension and a plurality of plies, the improvement comprising the steps of (A) applying about the circumference of an elongate mandrel a first fiber component, having a first tensile modulus, that is clockwise helically oriented to said first axis, said step of applying a first fiber component including the step of arranging said first fiber component at a first angle selectively varying relative to, and along said first dimension of, said composite member, (B) applying about the circumference of said elongate mandrel a second fiber component, having said first tensile modulus, that is counter-clockwise helically oriented to said first axis, said step of applying a second fiber component including the step of arranging said second fiber component at said first angle relative to, and along said first dimension of, said composite member, (C) applying about the circumference of said elongate mandrel a third fiber component, having a second tensile modulus, that is clockwise helically oriented to said first axis, said step of applying a third fiber component including the step of arranging said third fiber component at a second angle selectively varying relative to, and along said first dimension of, said composite member, and (D) applying about the circumference of said elongate mandrel a fourth fiber component, having said second tensile modulus, that is counter-clockwise helically oriented to said longitudinal axis, said step of applying a fourth fiber component including the step of arranging said fourth fiber component at said second angle relative to, and along said first dimension of, said composite member.

23. In a method according to claim 22, comprising the further step of arranging said first, second, third and fourth fiber components so that the cross-sectional area of said composite member is substantially constant along said first dimension of said composite member.

24. In a method according to claim 23, the further improvement comprising the step of disposing a matrix material with each of said fiber components for binding said fiber components together wherein said composite member has substantially uniform cross-sectional area along said first dimension.

25. In a method for manufacturing an axially extending composite member having a first axis and a first dimension and a plurality of plies, the improvement comprising the steps of (A) applying about the circumference of an elongate mandrel a first fiber component that is clockwise helically oriented to said first axis, said step of applying a first fiber component including the step of arranging said first fiber component at a first angle selectively varying relative to and along said first dimension of said composite member, (B) applying about the circumference of said elongate mandrel a second fiber component that is counter-clockwise helically oriented to said first axis, said step of applying a second fiber component including the step of arranging said second fiber component at said first angle relative to and along said first dimension of said composite member, (C) applying about the circumference of said elongate mandrel a third fiber component that is clockwise helically oriented to said first axis, said step of applying a third fiber component including the step of arranging said third fiber component at a second angle selectively varying relative to and along said first dimension of said composite member, (D) applying about the circumference of said elongate mandrel a fourth fiber component that is counter-clockwise helically oriented to said longitudinal axis, said step of applying a fourth fiber component including the step of arranging said fourth fiber component at said second angle relative to and along said first dimension of said composite member, and (E) arranging said first, second, third and fourth fiber components so that the cross-sectional area of said composite member is substantially constant along said first dimension of said composite member.

* * * * *

UNITED STATES PATENT AND TRADEMARK OFFICE
CERTIFICATE OF CORRECTION

PATENT NO.   :   5,549,947
DATED        :   August 27, 1996
INVENTOR(S)  :   Quigley et al.

It is certified that error appears in the above-indentified patent and that said Letters Patent is hereby corrected as shown below:

Correct the spelling of the inventor's name to "Stephen C. Nolet".

Signed and Sealed this

Fifth Day of August, 1997

Attest:

Attesting Officer

BRUCE LEHMAN

Commissioner of Patents and Trademarks